United States Patent [19]
Julian et al.

[11] Patent Number: 5,852,558
[45] Date of Patent: Dec. 22, 1998

[54] METHOD AND APPARATUS FOR REDUCING COMMON MODE VOLTAGE IN MULTI-PHASE POWER CONVERTERS

[75] Inventors: Alexander L. Julian, Madison; Thomas A. Lipo, Middleton; Deepakraj M. Divan, Madison, all of Wis.

[73] Assignee: Wisconsin Alumni Research Foundation, Madison, Wis.

[21] Appl. No.: 880,096

[22] Filed: Jun. 20, 1997

[51] Int. Cl.⁶ ......................................... H02M 1/12
[52] U.S. Cl. ............................... 363/132; 363/41
[58] Field of Search ........................ 363/98, 132, 41, 363/59, 56

[56] References Cited

U.S. PATENT DOCUMENTS

| | | | |
|---|---|---|---|
| 3,775,663 | 11/1973 | Turnbull | 363/41 |
| 4,507,724 | 3/1985 | Glennon | 363/89 |
| 4,730,242 | 3/1988 | Divan | 363/37 |
| 4,833,584 | 5/1989 | Divan | 363/37 |
| 4,864,483 | 9/1989 | Divan | 363/37 |
| 4,942,511 | 7/1990 | Lipo et al. | 363/136 |
| 5,280,421 | 1/1994 | DeDoncker et al. | 363/98 |
| 5,648,894 | 7/1997 | DeDoncker et al. | 363/39 |

OTHER PUBLICATIONS

Giri Ventakaramanan, et al., Discrete Pulse Modulation Strategies for High–Frequency Inverter Systems, PESC 1989 Conf. Rec., pp. 1013–1020.

Thomas G. Habetler & D. M. Divan, Performance Characterization of a New Discrete Pulse Modulated Current Regulator, 1988, pp. 395–405.

Giri Venkataramanan & Deepak Divan, Pulse Width Modulation with Resonant DC Link Converters, 1990 IEEE IAS Annual Meeting Conf. Rec., pp. 984–990.

Jin–Woo Lee, et al., A New Quasi–Resonant DC Link Inverter, EPE Firenze 1991, pp. 4–202–4–206.

*Primary Examiner*—Shawn Riley
*Attorney, Agent, or Firm*—Foley & Lardner

[57] ABSTRACT

Multi-phase power is provided to a load via the use of an inverter which has an even number of inverter legs. DC source voltage, such as from an AC-to-DC converter receiving power from a main AC power supply or from an independent DC power source such as a battery, is provided to the inverter. The DC source voltage is provided on DC bus lines of the inverter so as to be symmetric about ground. Switching devices in the inverter legs are controlled using a modulation strategy to synthesize desired output voltage waveforms on the inverter leg outputs from the voltage on the DC bus lines. The modulation strategy is subject to a modulation constraint such that, at any one time, half of the inverter legs provide a positive output voltage signal with respect to ground, and the other half of the inverter legs provide a negative output voltage signal, of equal magnitude, with respect to ground. If the multi-phase load to which the inverter is connected is a balanced impedance, the present invention makes possible the reduction or elimination of common mode voltage and, therefore, common mode current. Load balancing may be achieved using a multi-phase second order filter connected between the inverter leg outputs and the load. The present invention may be applied to power conversion systems including hard switching or soft switching inverters, and may be used in combination with conventional inverter modulation strategies.

30 Claims, 12 Drawing Sheets

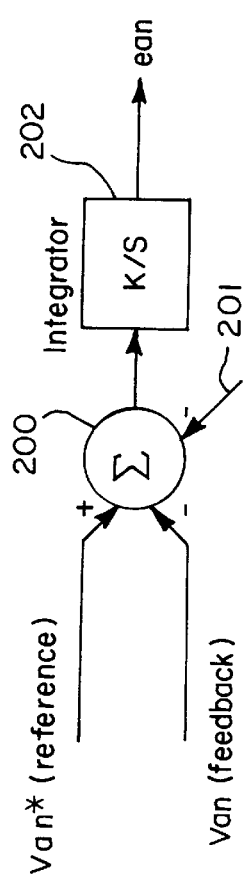
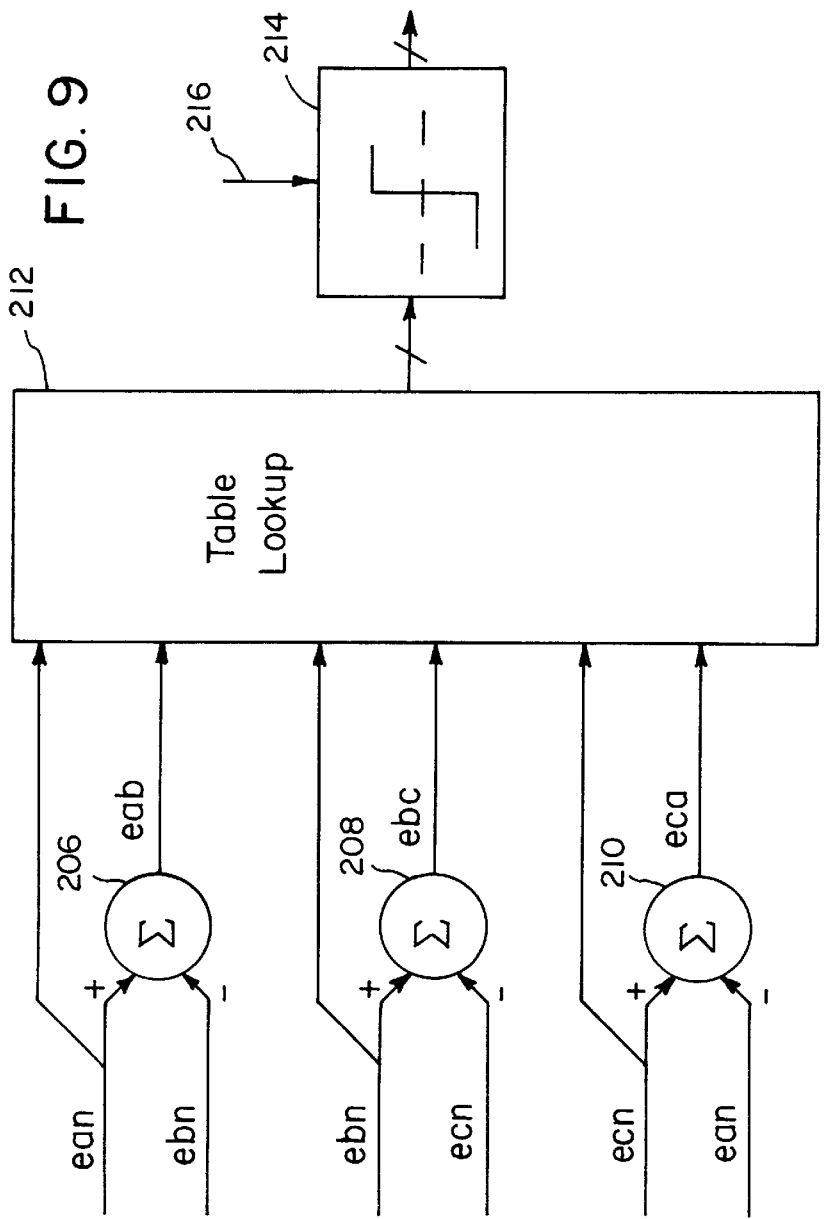

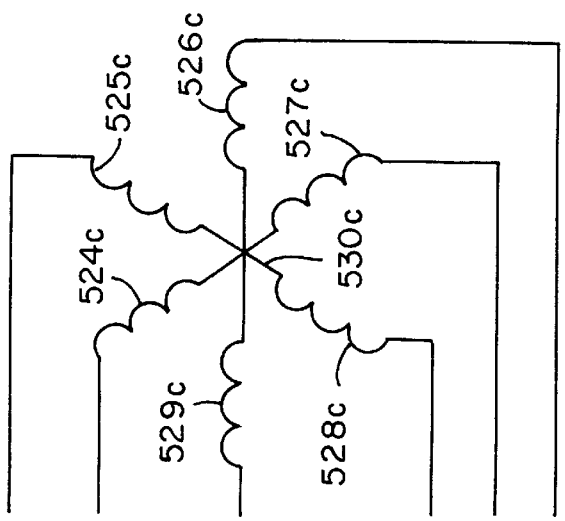
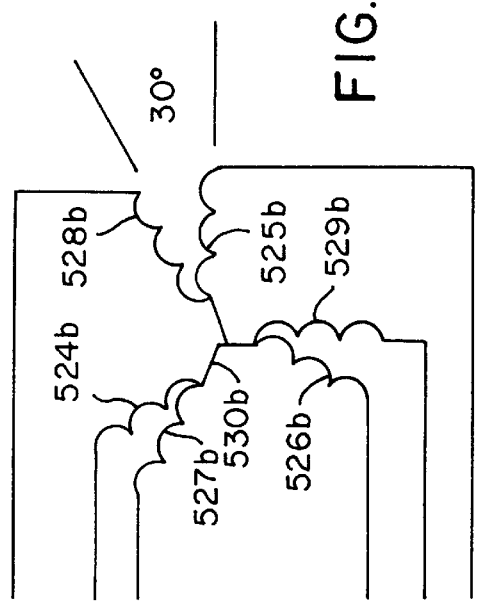
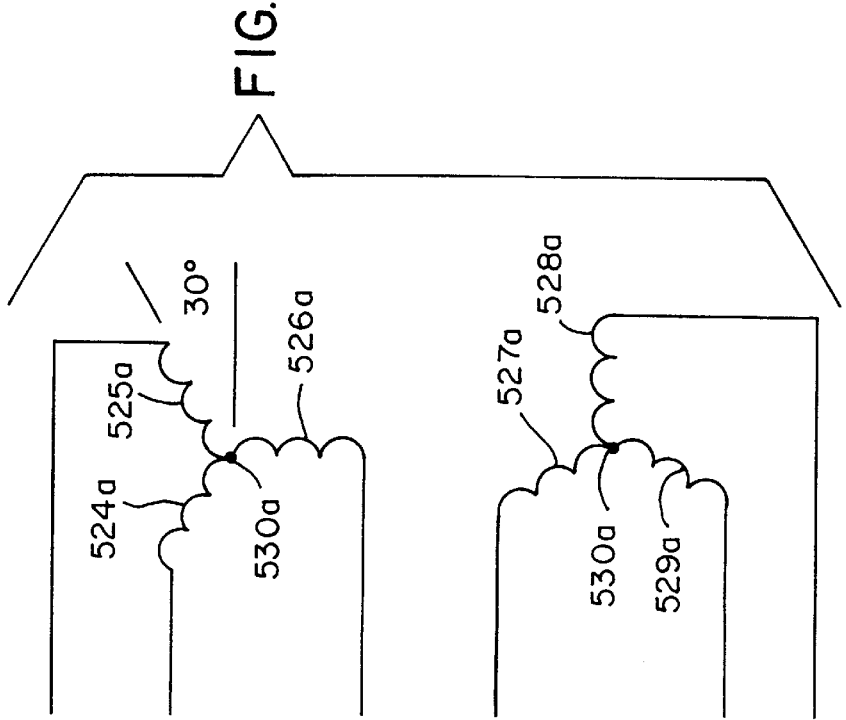
FIG. 16
FIG. 17
FIG. 18

METHOD AND APPARATUS FOR REDUCING COMMON MODE VOLTAGE IN MULTI-PHASE POWER CONVERTERS

This invention was made with United States Government support awarded by the following agencies: DOD Award No. NCEE/2419/TASK22; NSF Grant No. ECS-9510115 and ONR Award No. CR-4715-430620. The United States Government has certain rights in this invention.

FIELD OF THE INVENTION

This invention pertains generally to the field of electrical power systems, and, more particularly, to multi-phase AC power converters and methods and devices for controlling and regulating the output of such converters.

BACKGROUND OF THE INVENTION

Power conversion systems are typically used to provide sinusoidal single phase or multi-phase power to various types of equipment requiring electrical energy. An example of such a power conversion system is an AC-to-AC power converter. An AC-to-AC power conversion system is used to convert AC power at one frequency and/or power level to AC power at a frequency and power level which is required by a load. In a typical AC-to-AC power conversion system, AC power from a main AC power source is first rectified to provide a DC power signal across a DC bus. A DC-to-AC inverter is then used to derive the desired AC output power signals from the DC power provided on the DC bus. The DC-to-AC inverter typically includes inverter switching devices connected in a bridge formation between the DC bus lines and output terminals of the power conversion system. The inverter switching devices are controlled to connect the power on the DC bus lines to the system output terminals in a desired pattern such that AC output signals having the desired frequency and amplitude are synthesized from the DC power on the DC bus lines. Various modulation strategies may be employed for controlling the inverter switching devices, including: pulse-width modulation (PWM), hysteresis, space vector, and pulse density modulation (PDM). This same basic power conversion scheme is also used for DC-to-AC power converters. In such systems, DC power may be provided on DC bus lines directly from a DC power source, such as a battery. AC output signals are then derived from the DC power on the DC bus lines using a selected modulation strategy.

Improved efficiency in AC-to-AC and DC-to-AC power conversion systems can be achieved utilizing a resonant DC link on the DC bus of the power conversion system. By controlling the inverter switching devices in an appropriate manner, an oscillation may be generated and maintained on the resonant link such that the DC bus voltage periodically reaches zero volts. The inverter switching devices may then be controlled to switch on and off only at times when the DC bus voltage is zero, thereby eliminating switching losses in the inverter, increasing inverter efficiency, and making higher switching frequencies possible. In resonant DC link power conversion systems, a voltage clamp circuit may be employed to limit the maximum voltage appearing across the DC bus, thereby reducing voltage stresses on the inverter switching devices. The clamp circuit may be an active or passive clamp which is designed to maintain the oscillation in the resonant link. Resonant DC link power conversion systems, passive and active voltage clamps for such systems, and methods for controlling such systems, are described in more detail in U.S. Pat. No. 4,864,483, to Deepakraj M. Divan, entitled STATIC POWER CONVERSION METHOD AND APPARATUS HAVING ESSENTIALLY ZERO SWITCHING LOSSES AND CLAMPED VOLTAGE LEVELS, the disclosure of which is hereby incorporated by reference.

Of primary interest in controlling a multi-phase power conversion system is conditioning the output power with respect to the differential phase voltages. Thus, for example, in a power conversion system providing AC power to the terminals of a three-phase machine, such as a motor, the inverter switching devices are controlled such that the voltage signals applied between the motor terminals are conditioned and regulated to provide sinusoidal voltage waveforms at the desired phase, frequency, and amplitude. Conditioning the output power of a multi-phase power conversion system with respect to the differential phase voltages is readily achieved using traditional modulation techniques and traditional inverter topologies.

Providing balanced voltage signals to unbalanced multi-phase loads presents another difficulty for controlling multi-phase power conversion systems. For providing balanced AC voltages to, for example, an unbalanced three-phase load, it has been found that a four-leg inverter, in combination with an appropriate inverter switching scheme, may effectively be used. In such a system, the output of the fourth leg of the inverter is connected directly to the neutral point of the unbalanced three-phase load. Thus, the switching devices in the fourth leg may be controlled in such a way as to directly control the neutral voltage of the three-phase load. The presence of the fourth inverter phase leg allows true free-wheeling states to be selected in the other three phases, which is not possible using a conventional three-leg inverter topology. In the four leg inverter topology, the inverter switching devices are controlled to provide regulated current to the load by entering one of sixteen possible switching states. The inverter leg connected to the neutral point of the load determines the instantaneous phase voltage polarity of the other three legs. Note that in this topology, no two of the other three inverter phase legs can be controlled simultaneously to have opposite polarities, i.e., the other three phases must all be controlled simultaneously to have positive polarities, negative polarities, a combination of positive polarities and zero voltage, or a combination of negative polarities and zero voltage. The use of a four-leg inverter to provide balanced voltages to unbalanced three-phase loads is described in further detail in U.S. Pat. No. 5,280,421 and in Giri Venkataramanan, et al., "Discrete Pulse Modulation Strategies for High-Frequency Inverter Systems", PESC, 1989 Conf. Rec., pp. 1013–1020.

As discussed previously, pulse width modulation, or various other modulation strategies, may be used to control the switching devices of a power conversion system to provide conditioned differential phase voltages between the terminals of a multi-phase load. However, with such traditional modulation techniques, the instantaneous algebraic average of the multi-phase power signals being provided to the load, referred to a common reference, e.g., ground, may typically not be zero. This voltage potential, known as the common mode voltage, appears at the neutral point of the multi-phase load, and induces a common mode current between the load neutral and ground.

Common mode currents introduce numerous problems in electrical systems. In aircraft, for example, inductively coupled common mode currents may interfere with systems such as sensitive avionic equipment that may be vulnerable to electromagnetic interference (EMI). In industrial applications, common mode current can cause computers and control equipment to malfunction. In motor drives and electrical networks, common mode current has the potential to cause physical damage or unwanted tripping of relays. Also, recent research has identified damage to electric machines caused by bearing currents. These currents are created by the common mode voltage applied to the machine by the power conversion system supplying power thereto. Common mode voltage and current problems can occur in both balanced and unbalanced loads.

Substantial common mode voltage between the load neutral and earth ground typically exists in conventional multi-phase power conversion systems. As modulation frequencies increase, and machine zero sequence impedances decrease, common mode voltages cause larger common mode currents to be generated. Larger common mode currents worsen EMI problems, and can increase the potential for damaging the network or the machine that is being provided power by the power conversion system. Currently, reduction of common mode voltage is achieved using high impedance common mode filters (such as baluns), which are typically large, complicated, and expensive.

SUMMARY OF THE INVENTION

The present invention provides a method and apparatus for reducing common mode voltage in multi-phase power conversion systems. In accordance with the present invention, multi-phase AC power is provided to a multi-phase load from a DC source voltage via the use of an inverter which includes an even number of inverter legs. Each inverter leg includes inverter switching devices connected between DC bus lines of the inverter. The DC source voltage may be provided by an AC-to-DC converter, receiving power from a main AC power system, or from an independent DC power source, such as a battery. The DC source voltage is provided to positive and negative DC bus lines of the inverter such that the DC source voltage is symmetric about earth ground. This may be achieved by dividing the DC source voltage across two balanced capacitors connected in series across the DC bus lines, and connecting the center point of the series connected capacitors to ground. Thus, for a DC source voltage level of $V_{dc}$, when the switching devices in the inverter legs are activated, either $+V_{dc}/2$ or $-V_{dc}/2$ will be applied to the inverter leg outputs.

A system controller controls the switching devices in the inverter legs such that regulated and conditioned AC voltage signals are synthesized at the inverter leg outputs that are connected to provide power to a multi-phase load. For this purpose, an essentially conventional modulation strategy, e.g., PWM, hysteresis, space vector, or PDM, may be employed. However, in accordance with the present invention, the modulation strategy is subject to an overriding modulation constraint which is employed by the system controller in order to reduce or eliminate the common mode voltage which would otherwise appear between the load neutral and ground.

In order to maximize common mode voltage reduction, the multi-phase load to which the inverter is connected preferably presents a balanced impedance to the inverter. A balanced impedance on the inverter outputs may be achieved using a multi-phase LC filter connected between the inverter leg outputs and the load.

In accordance with the present invention, reduction or elimination of common mode voltage is achieved by controlling the inverter switching devices subject to a modulation constraint such that an equal number of the inverter leg outputs are connected simultaneously to the positive DC bus line as are connected to the negative DC bus line of the inverter. Since, at any one time, equal numbers of inverter leg outputs are connected to $+V_{dc}/2$ and $-V_{dc}/2$, and if the load itself is balanced, the instantaneous algebraic average of the signals applied to the load, with reference to ground, will be zero. Thus, in accordance with the present invention, common mode voltage, and, therefore, common mode current, can be reduced or eliminated.

An exemplary embodiment of the present invention is a four leg inverter connected to provide power to a three-phase load, such as a three-phase motor. In this exemplary embodiment, three of the four inverter leg outputs are connected to provide power to the three-phase input terminals of the load. The output of the fourth inverter leg is connected in parallel with the other three inverter legs. A four-phase LC filter is provided between the four inverter leg outputs and the three load terminals to provide a balanced impedance load. An essentially conventional modulation strategy is used to control the switching devices in the first three inverter legs to provide regulated and conditioned differential power signals to the input terminals of the load. To implement the modulation constraint, the switching devices in the fourth inverter leg are controlled such that the output of the fourth inverter leg balances the number of inverter leg outputs that are connected to the positive and negative DC bus lines of the inverter.

Reduction of common mode voltage in multi-phase power conversion systems in accordance with the present invention may be implemented using either conventional hard-switched inverters or soft-switched inverters employing a resonant DC link and zero voltage switching modulation techniques.

The present invention may be employed to reduce common mode voltage in power conversion systems having any number of phases. For multi-phase loads having an even number of phases, e.g., four-phase or six-phase machines, an inverter topology having a number of inverter legs equal to the number of phases required by the load may be used. Each of the inverter leg outputs is connected to one of the input phases of the load. Multi-phase LC filtering on the outputs of the inverter legs may be employed, as necessary, to provide a balanced load impedance. A modulation strategy subject to the modulation constraint of the present invention is employed such that the number of inverter phases connected to the positive DC bus voltage of the inverter is always equal to the number of inverter phases connected to the negative DC bus voltage of the inverter, to thereby reduce or eliminate the common mode voltage.

For providing power to a multi-phase load having an odd number of phases an extra inverter leg is provided. The output of the extra inverter leg is connected, via an appropriate LC filter to provide a balanced impedance for all of the phases, in parallel with the outputs of the inverter legs connected to the input terminals of the multi-phase load. A modulation strategy subject to the modulation constraint of the present invention is then employed. The output of the additional inverter leg is controlled to ensure that equal numbers of inverter leg outputs are connected to the positive and negative DC bus voltages of the inverter.

A multi-phase power conversion system or method in accordance with the present invention may be used to reduce or completely eliminate the common mode potential produced by traditional modulation techniques and traditional inverter topologies. Common mode current, and the EMI and other problems which result therefrom, are thereby reduced or eliminated by the present invention. The present invention thus provides an alternative to the expensive and large high impedance common mode filters which conventionally are used to reduce common mode currents.

Further objects, features, and advantages of the invention will be apparent from the following detailed description when taken in conjunction with the accompanying drawings.

BRIEF DESCRIPTION OF THE DRAWINGS

In the drawings:

FIGS. 8 and 9 are block diagrams of an exemplary control system for controlling the inverter switching devices of the inverter of FIG. 7 in accordance with the present invention to reduce the common mode voltage.

FIGS. 16–18 are schematic illustrations of three possible winding connections that may be used to realize a six-phase machine load.

DETAILED DESCRIPTION OF THE INVENTION

Figure 1:
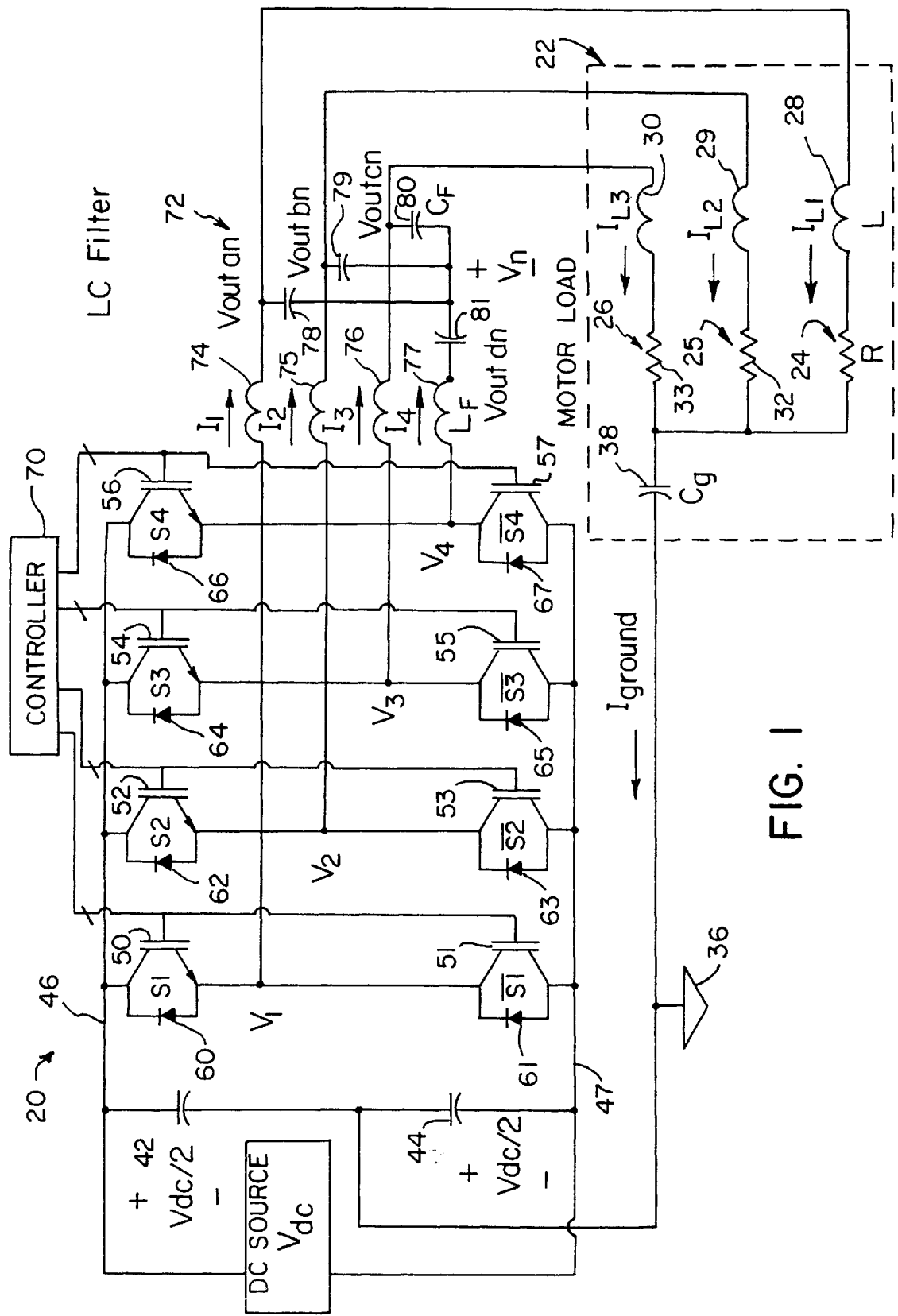
FIG. 1 is a schematic circuit diagram of a four-phase inverter in accordance with the present invention for providing power to a three-phase load and for reducing the common mode voltage of the load.

The present invention provides a power conversion system for reducing or eliminating the common mode voltage provided to a load. The present invention will initially be described and illustrated in detail with respect to the exemplary embodiment of a power conversion system for providing power to a three-phase load, such as a three-phase motor. It should be understood, however, that the present invention is not limited to systems for providing three-phase power, but may also be applied to reduce the common mode voltage in AC power provided to loads having any number of phases, as will be discussed in more detail below.

A four-phase inverter 20 in accordance with the present invention is described with reference to FIG. 1. The four-phase inverter 20 is connected to provide three-phase power to a three-phase load 22. The three-phase load 22 may be a three-phase machine, e.g., a three-phase motor, or any other device or combination of devices requiring three-phase power. In this case, a three-phase motor load 22 includes three motor windings 24–26, which are schematically represented by series connected inductances 28–30, each having an inductance value L, and resistances 31–33, each having a resistance value R, respectively. The motor windings 24–26 are connected together at a load neutral point 34. The motor load 22 may be coupled to ground 36 at the load neutral 34, such as via capacitive coupling through a capacitor 38 having a capacitance value of $C_g$. As will be discussed in more detail below, each winding 24–26 of the motor load 22 is connected to one of the inverter leg outputs of the four-phase inverter 20.

A DC voltage source 40 provides DC source voltage input power for the four-phase inverter 20. The DC source voltage may preferably be provided in a conventional manner from a main source of AC power, such as a single or multi-phase utility line. The AC power is rectified, using an AC-to-DC converter, to provide the DC source voltage. Alternatively, the DC source voltage may be provided directly from a DC battery or other type of unipolar voltage source. The DC source voltage 40 is provided to the four-phase inverter 20 such that the source voltage is symmetric about earth ground 36. Thus, the DC source voltage may be provided across two balanced capacitors 42 and 44, which are connected in series. The center point where the capacitors 42 and 44 are connected together is connected to ground 36. The capacitors 42 and 44 are selected to be of equal value such that, for a DC source voltage of $V_{dc}$, the voltage across each capacitor 42 and 44 is $V_{dc}/2$.

The DC source voltage across the capacitors 42 and 44 is applied to positive and negative inverter DC bus lines 46 and 47, respectively. Series connected pairs of inverter switching devices 50 and 51, 52 and 53, 54 and 55, and 56 and 57, are connected across the DC bus lines 46 and 47 to form the four legs of the four-phase inverter 20. (Note that the switching devices may also be referred to as switching devices S1 and /S1 for the first inverter phase, switching devices S2 and /S2 for the second inverter phase, switching devices S3 and /S3 for the third inverter phase, and switching devices S4 and /S4 for the fourth inverter phase, respectively.) The switching devices 50–57 may be implemented using conventional semiconductor based power switching devices, such as IGBTs. Each switching device 50–57 has an associated anti-parallel connected diode 60–67, respectively. The node at which the switching devices in each leg of the inverter 20 are connected together is the output of that inverter leg.

The inverter switching devices 50–57 are turned on and off in response to switching control signals provided by a system controller 70. The system controller 70 may be implemented in the manner of conventional inverter switching device controllers, and may include a combination of digital and/or analog switching device control and drive circuitry, which may include a microprocessor, digital signal processor, or the like. The inverter switching devices 50–57 are controlled by the system controller 70 to connect either the positive DC bus line 46 or the negative DC bus line 47 to the output of a particular inverter leg. Thus, the output voltage $V_1$ of the first inverter leg will be either $+V_{dc}/2$ or $-V_{dc}/2$, depending on whether inverter switching device S1 or switching device /S1 is turned on by the system controller 70. Similarly, the inverter leg output voltages $V_2$, $V_3$, and $V_4$, of the second, third, and fourth inverter legs, are either $+V_{dc}/2$ or $-V_{dc}/2$, depending on the switching states of inverter switching devices S2 and /S2, S3 and /S3, and S4 and /S4, respectively, as defined by the switching control signals provided by the system controller 70.

A four-phase second order (LC) filter 72 is preferably connected between the inverter outputs and the three windings 24–26 of the three-phase motor load 22. The second order four-phase filter 72 may be implemented by an inductor 74, 75, 76, or 77 connected in series between the output of each inverter leg and the multi-phase load inputs, and a capacitor 78, 79, 80 or 81 connected between the inductors 74–77, respectively, and a filter neutral point. The inductance values $L_f$ of the inductors 74–77 and the capacitance values $C_f$ of the capacitors 78–81 which form the LC filter 72 are selected such that the load 22 appears as a balanced impedance to the four-phase inverter 20. Filtering to achieve a balanced load impedance for all four inverter phases may be accomplished, as illustrated, using discrete LC components, either independently, or in combination with the inherent impedance of the load 22 to which the inverter 20 is connected. As will be discussed in more detail below, a balanced impedance load makes possible a significant reduction, or even elimination, of common mode voltage by the present invention.

In the absence of the fourth inverter leg, and associated LC filter components, it is apparent that the power conversion system illustrated in FIG. 1 is representative of an essentially conventional hard-switched three-phase inverter connected to provide power to a three-phase load. With an appropriate modulation strategy for controlling the switching devices in the first three inverter legs, and a three-phase LC filter on these three legs of the inverter, sinusoidal line-to-line output voltages may be provided to the three-phase load by the inverter. In accordance with the present invention, any conventional modulation strategy (e.g., PWM, hysteresis, space vector, or PDM) may be implemented by the system controller 70 for controlling the switching devices in the first three legs of the inverter 20 to provide three-phase output power to the load 22. However, in accordance with the present invention, the basic modulation strategy employed for the first three inverter phases is modified to take advantage of the fourth phase leg of the inverter 20 to achieve an output neutral voltage which is equal to zero at all times, thereby reducing or completely eliminating the common mode potential produced by traditional modulation techniques. This modification to the basic three-phase modulation strategy is known as the modulation constraint of the present invention.

In accordance with the present invention, the system controller 70 controls the inverter switching devices 50–57 in a pattern to synthesize a regulated three-phase output power signal which is provided to the three-phase load 22. In accordance with the present invention, this basic modulation strategy is subject to the modulation constraint, which ensures that half of the inverter leg outputs are connected to the positive DC bus line 46 while, simultaneously, the other half of the inverter leg outputs are connected to the negative DC bus line 47. Thus, at any one time, two of the inverter leg output voltages $V_{1-4}$ are at $+V_{dc}/2$, and the other two of the inverter leg output voltages $V_{1-4}$ are at $-V_{dc}/2$. Control of the inverter leg switching devices in accordance with the present invention may be achieved by controlling the switching devices in the first three inverter legs using a conventional modulation strategy to synthesize a three-phase output voltage power signal for the three-phase load 22, and by controlling the switching devices in the fourth inverter leg in order to meet the modulation constraint. It is noted that the modulation constraint places a constraint on the allowable switching states of the inverter leg switching devices that may be employed. As a consequence of the modulation constraint, the zero state, wherein all three of the first three inverter leg outputs are connected to the same DC bus line 46 or 47, is not allowed. However, in the presence of a balanced load, common mode voltage can be eliminated with any modulation strategy, provided that the modulation constraint is satisfied.

It can be shown theoretically that the filter neutral voltage $V_n$, and, therefore, the common mode voltage, can be completely eliminated if the modulation constraint is satisfied. Restated mathematically, the modulation constraint establishes the necessary condition to achieve zero common mode voltage as:

$$V_1 + V_2 + V_3 + V_4 = 0. \tag{1}$$

It is apparent that Equation 1 is satisfied whenever half of the inverter leg outputs are connected to $+V_{dc}/2$ and the other half are connected to $-V_{dc}/2$.

In order to simplify the analysis, it can be assumed that the three-phase load 22 is balanced and:

$$I_{L1} + I_{L2} + I_{L3} = 0, \tag{2}$$

where $I_{L1-3}$ are the currents in the windings 24–26, respectively, of the motor load 22.

Given the constraint of Equation 2, it is apparent that:

$$I_1 + I_2 + I_3 + I_4 = 0, \tag{3}$$

where $I_{1-4}$ are the output currents of the four legs of the four-phase inverter 20.

The voltage loop equations for the power conversion system of FIG. 1 are:

$$V_1 - (V_{outan} + V_n) = L_F \cdot \frac{dI_1}{dt}, \tag{4}$$

$$V_2 - (V_{outbn} + V_n) = L_F \cdot \frac{dI_2}{dt}, \tag{5}$$

$$V_3 - (V_{outcn} + V_n) = L_F \cdot \frac{dI_3}{dt}, \text{ and} \tag{6}$$

$$V_4 - (V_{outdn} + V_n) = L_F \cdot \frac{dI_4}{dt}, \quad (7)$$

where: $V_{outan}$, $V_{outbn}$, $V_{outcn}$, and $V_{outdn}$, are the voltages at the four output nodes of the four-phase LC filter 72.

The corresponding current nodal equations at these nodes are:

$$I_1 = C \cdot \frac{dV_{outan}}{dt} + I_{L1}, \quad (8)$$

$$I_2 = C \cdot \frac{dV_{outbn}}{dt} + I_{L2}, \quad (9)$$

$$I_3 = C \cdot \frac{dV_{outcn}}{dt} + I_{L3}, \text{ and} \quad (10)$$

$$I_4 + C \cdot \frac{dV_{outdn}}{dt}. \quad (11)$$

By substituting Equations 8–11 into Equation 3, and using Equation 2, it can be shown that the four nodal voltages $V_{outan}$, $V_{outbn}$, $V_{outcn}$ and $V_{outdn}$ must add up to a constant value. However, at time t=0 (upon initial energization), these nodal voltages are clearly zero. Thus:

$$V_{outan} + V_{outbn} + V_{outcn} + V_{outdn} = 0 \quad (12)$$

Substituting Equations 4–7 into Equation 1, and using Equations 12 and 3, yields:

$$-4V_n = L \frac{d(I_1 + I_2 + I_3 + I_4)}{dt} = O. \quad (13)$$

This result shows that the filter neutral voltage $V_n$ remains zero for all time and, therefore, that the common mode voltage can be eliminated by implementing the modulation constraint of the present invention.

When the assumption of Equation 2 is relaxed, but the modulation constraint of Equation 1 is used, and the filter and load are assumed to be balanced, then the inverter leg output voltages $V_1$, $V_2$, and $V_3$ can be eliminated, and the filter neutral voltage transfer function can be expressed as a function of the output voltage $V_4$ of the fourth inverter leg:

$$\frac{V_n}{V_4} = \frac{s^2 L_f + s R_F}{s^4 b_4 + s^3 b_3 + s^2 b_2 + s b_1 + b_o}, \quad (14)$$

where:

$$b_4 = 4L_F C_F L + 3C_F L_F^2, \quad (15)$$

$$b_3 = 4RL_F C_F + 4R_F C_F L + 6R_F C_F L_F, \quad (16)$$

$$b_2 = 12L_F \frac{C_F}{C_g} + 4R_F C_F R + 4(L_F + L) + 3C_F R_F^2, \quad (17)$$

$$b_1 = 12R_F \frac{C_F}{C_g} + 4(R_F + R), \text{ and} \quad (18)$$

$$b_o = \frac{12}{C_g}, \quad (20)$$

where $L_F$, $C_F$ and $R_F$ are the inductance, capacitance, and resistance associated with each phase of the four-phase second order filter 72.

Figure 2:
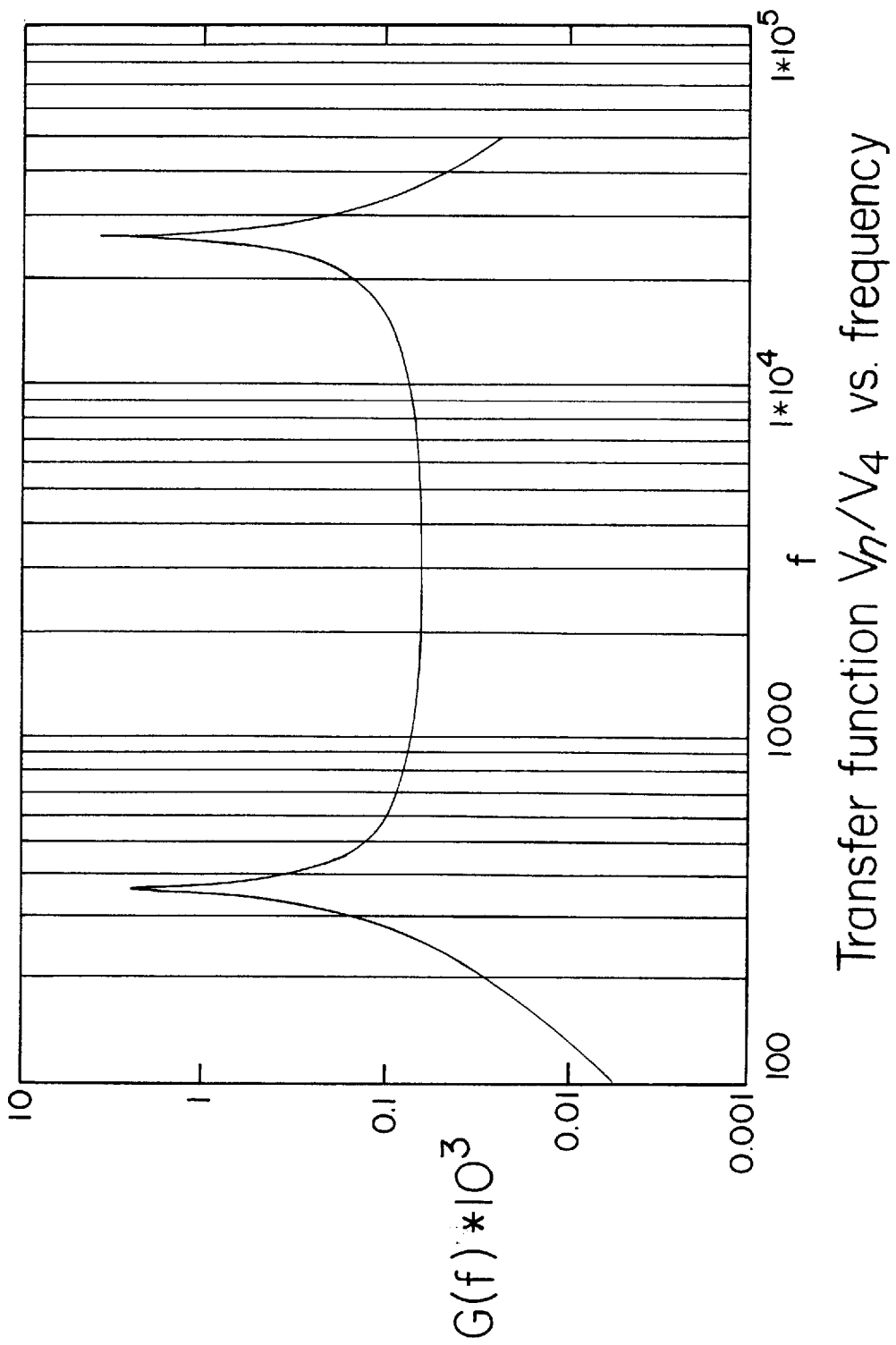
FIG. 2 is a plot of the transfer function of the filter neutral voltage expressed as a function of the voltage provided by the fourth inverter leg output of a four-phase inverter in accordance with the present invention for reducing common mode voltage of a three-phase load and having a four-phase filter connected between the inverter and the load.

Equation 14 identifies the eigenvalues of the filter 72 and the resonant frequencies which may exist in the filter. FIG. 2 is a plot of the gain of Equation 14, identifying the resonant frequencies of concern. Equation 14 predicts a resonance in the fourth inverter phase which is confirmed by laboratory observations. The low gain of the filter neutral voltage $V_n$, as illustrated in FIG. 2, indicates that even in the presence of some common mode current, i.e., where Equation 2 is not equal to 0, the filter neutral voltage is still very small.

A complete model of the three-phase power conversion system of FIG. 1, including the four-phase power inverter 20, the second order four-phase filter 72, and a simplified high frequency three-phase motor load 22 with capacitive coupling to ground, was simulated. A sine triangle PWM modulation technique was used to control the switching devices in the four-phase inverter 20. The PWM modulation technique used three carrier waves phase displaced by 120° in order to satisfy the modulation constraint of Equation 1. This modification to the single carrier sine triangle modulation technique introduces somewhat higher differential voltage distortion, while eliminating common mode voltage distortion. This modulation technique is also limited to a modulation index of 0.66. Beyond a modulation index of 0.66, the modulation constraint of Equation 1 is no longer satisfied. A conventional three-phase power conversion system, including a conventional hard-switching three-phase power inverter providing power to a three-phase load, was also simulated.

Figure 3:
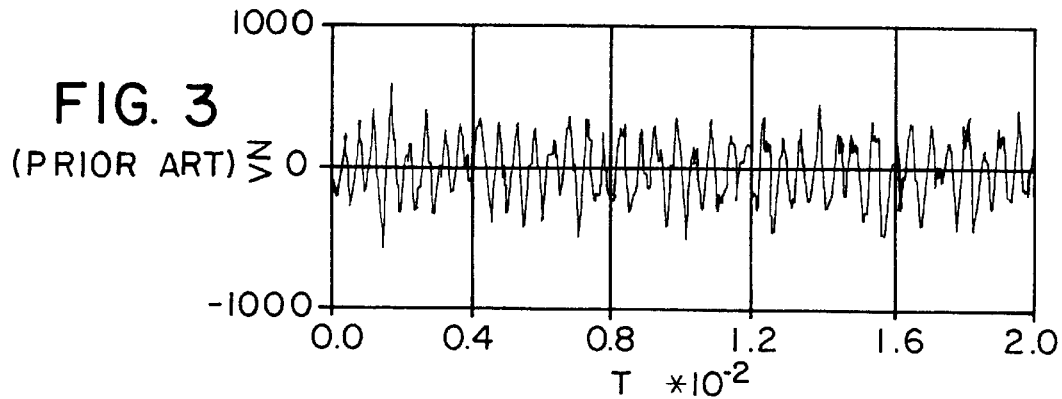
FIG. 3 is a waveform diagram of simulated neutral to ground voltage for a three-phase load being provided with power by a conventional three-phase inverter.
Figure 4:
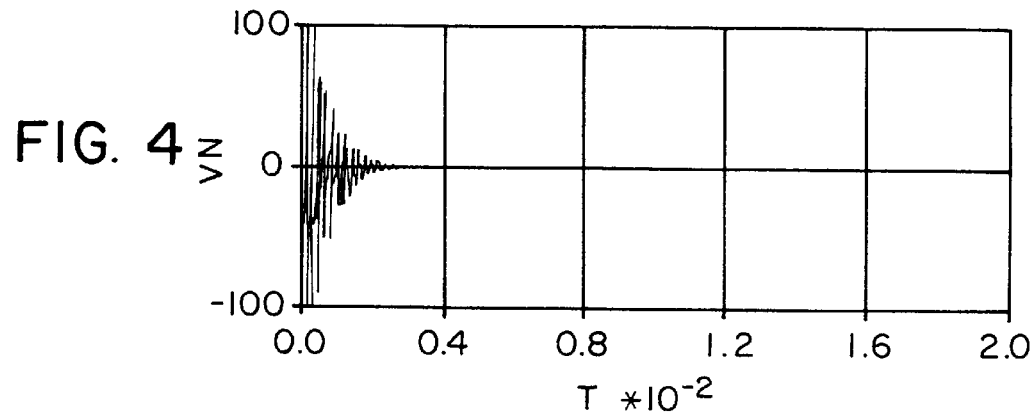
FIG. 4 is a waveform diagram of simulated neutral to ground voltage for a three-phase load being provided with power by a four-phase inverter in accordance with the present invention.
Figure 5:
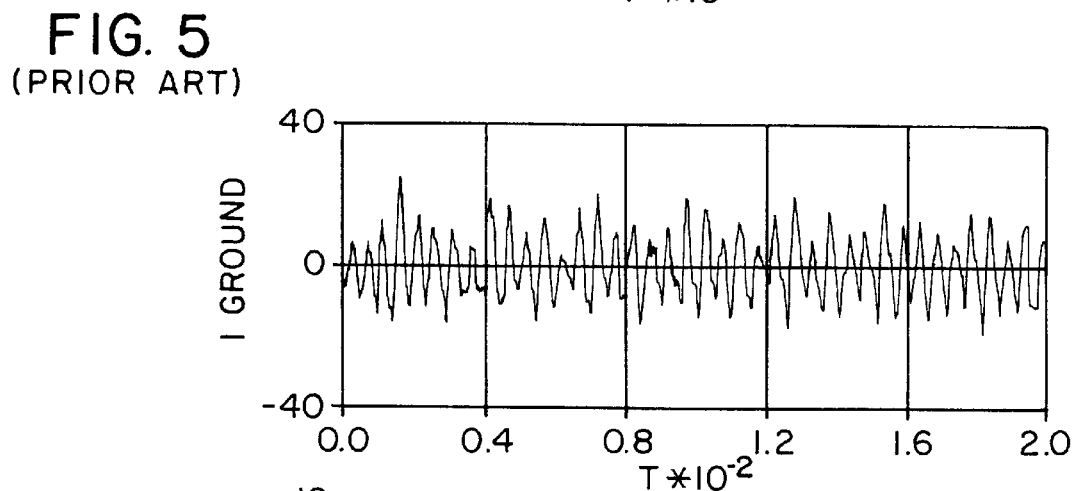
FIG. 5 is a waveform diagram of simulated current flowing in the ground wire of a three-phase load being provided with power by a conventional three-phase inverter.
Figure 6:
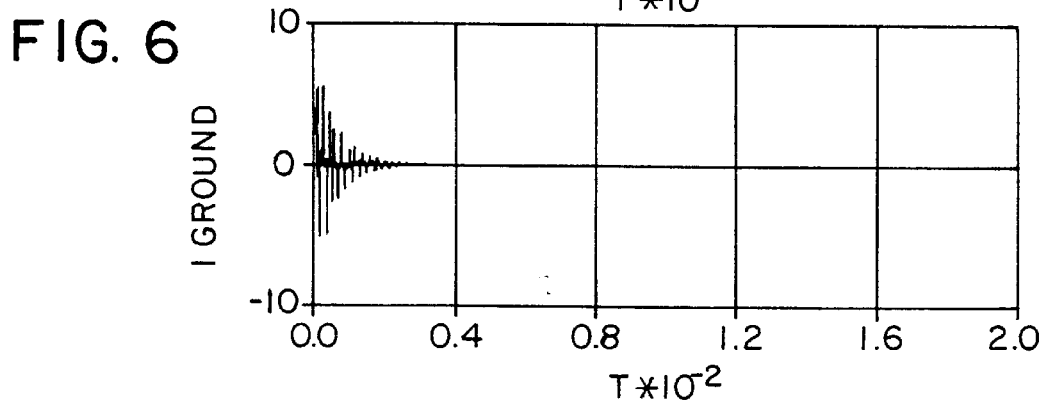
FIG. 6 is a waveform diagram of simulated current flowing in the ground wire of a three-phase load being provided with power by a four-phase inverter in accordance with the present invention.

The simulation results shown in FIGS. 3–6 illustrate the capability of a power conversion system in accordance with the present invention to reduce or eliminate common mode voltage and current. FIG. 3 illustrates the simulated neutral voltage $V_n$ in the conventional three-phase system. FIG. 4 illustrates the simulated neutral voltage for the power conversion system employing a four-phase power inverter in accordance with the present invention. By comparing FIGS. 3 and 4, it can be seen that the neutral voltage in the four-phase topology of the present invention is zero, while in the conventional three-phase inverter topology substantial neutral voltage exists. FIG. 5 illustrates the simulated current flowing in the ground wire of a motor load being supplied with power by a conventional three-phase inverter. FIG. 6 illustrates the simulated current flowing in the ground wire of a motor load 22 being supplied with power by a four-phase inverter in accordance with the present invention. A comparison of FIGS. 5 and 6 demonstrates that the common mode current flowing in the ground wire of a conventional three-phase inverter topology is eliminated by use of the four-phase inverter topology of the present invention.

Another exemplary embodiment of the present invention is the four-phase actively clamped resonant DC link (ACRDCL) inverter 120 which is illustrated in and which will be described with reference to FIG. 7. The ACRDCL inverter 120 is connected to provide power to a three-phase load 122. In this case, the three-phase load 122 is represented as a three-phase resistive load, including resistances 131, 132, and 133 in each phase, respectively, of the load 122. A DC voltage source 140 provides DC source voltage $V_{dc}$ across a voltage source capacitor 141. As discussed previously, the voltage across the DC voltage source capacitor 141 may be provided from an AC-to-DC converter, which receives AC line power from a main AC power source, or from an independent DC power source, such as a battery. The DC source voltage $V_{dc}$ is divided evenly across series connected capacitors 142 and 144. The capacitors 142 and 144 are balanced such that a voltage of $V_{dc}/2$ appears across each capacitor 142 and 144. The DC source voltage is also applied across the positive 146 and negative 147 DC bus lines of the ACRDCL inverter 120.

Series connected pairs of switching devices 150 and 151, 152 and 153, 154 and 155, and 156 and 157, such as IGBTs, with anti-parallel connected diodes 160 and 161, 162 and 163, 164 and 165, and 166 and 167, respectively, which may be integrally formed with the IGBT switching devices, are connected across the DC bus lines 146 and 147 of the ACRDCL inverter 120 to form four inverter legs. The switching devices in each series connected pair of inverter switching devices are connected together at a node which forms the output of the respective inverter leg.

A system controller 170 provides switching device control signals to the switching devices 150–157 to connect the output of each inverter leg to either the positive 146 or negative 147 DC bus line. The switching devices 150–157 are turned on and off by the controller 170 in a pattern so as to synthesize a three-phase output voltage waveform at the outputs of the first three inverter legs, which are connected to provide power to the three-phase load 122, as well as to reduce or eliminate common mode voltage in the power conversion system.

A four-phase LC filter 172 is preferably connected to the inverter leg outputs, between the ACRDCL inverter 120 and the load 122. The second order filter 172 includes inductors 174, 175, 176, and 177 connected in series between the inverter leg outputs and the load 122, and capacitors 178, 179, 180, and 181 connected between inductors 174, 175, 176, and 177, respectively, and a common filter neutral node. To provide passive damping of resonance in the fourth inverter leg, a resistive load 182 is placed in parallel with the capacitive portion 181 of the filter 172 which is associated with the fourth inverter leg, i.e., the inverter leg that is not connected to provide power directly to the load 122. The LC filter 172 ensures that the load 122 appears as a balanced impedance to the ACRDCL inverter 120. In this case, the filter neutral node is capacitively coupled, by a capacitor 184, to ground.

The filter neutral node is also connected to the center point where voltage source capacitors 142 and 144 are joined together. This establishes a neutral output voltage level for the ACRDCL inverter 120 such that when an inverter switching device is turned on to connect the positive DC bus line 146 to an inverter leg output, a voltage level of positive one-half of the instantaneous DC bus voltage is applied to the inverter leg output. Similarly, when an inverter switching device is turned on to connect the negative DC bus line 147 to the output of an inverter leg, a voltage level of negative one-half of the instantaneous DC bus voltage is applied to the output of the inverter leg.

The ACRDCL inverter 120 includes a resonant link connected to the DC bus lines 146 and 147. The resonant link includes a resonant capacitor 186, connected between the DC bus lines 146 and 147, and a resonant inductor, implemented as two inductors 188 and 189 connected in series between the DC voltage source capacitor 141 and the DC bus lines 146 and 147, respectively. The resonant link capacitor 186 and inductors 188 and 189 cause the voltage across the DC bus lines 146 and 147 to oscillate between the source voltage level $V_{dc}$ and zero. To illustrate the operation of the resonant circuit, assume that the DC voltage source 140 is initially disconnected from the circuit. If the voltage $V_{dc}$ from the DC voltage source 140 is now applied to the system, for loss-less inductors 188 and 189 and capacitor 186, the voltage across the DC bus lines 146 and 147 will vary between $V_{dc}$ and zero, and have an average value of ½ $V_{dc}$, with the voltage across the DC bus lines 146 and 147 varying at the resonant frequency of the resonant circuit composed of the inductors 188 and 189 and the capacitor 186. Every cycle, when the DC bus voltage returns to zero volts, the inverter switching devices 150–157 in the inverter legs may be turned on or off in a loss-less manner. Thus, the ACRDCL inverter 120 may be operated much more efficiently, and at a faster switching frequency, than the hard-switched inverter 20 described previously with respect to FIG. 1.

Note that for practical LC resonant circuits, having finite Q factors, the voltage across the DC bus lines 146 and 147 will never return to zero after the DC voltage source is applied to the system, and will finally stabilize at the DC source voltage level $V_{dc}$. However, the resonant oscillation on the DC bus lines 146 and 147 may be maintained by turning on both switching devices in one of the inverter legs for a brief period during each cycle of the oscillation. During the period when both switching devices in one of the inverter legs is turned on, the current in the inductors 188 and 189 will increase linearly. The switching devices in the inverter leg may be turned off when sufficient energy is stored in the inductors 188 and 189 to ensure that the voltage across the DC bus lines 146 and 147 will return to zero. At that time, both switching devices in an inverter leg may be turned on once again, to repeat the process. Thereby, a stable oscillation of the resonant circuit is established, and a stable DC resonant link voltage across the DC bus lines 146 and 147 is provided. The details of controlling switching devices in a resonant DC link inverter to maintain an oscillation in the DC resonant link will be well-known to those having skill in the art of resonant DC link inverters. Further details may also be found in U.S. Pat. No. 4,864,483, the disclosure of which is incorporated herein by reference.

In resonant DC link inverters, switching device voltage stresses of 2.5 to 3 times the effective DC source voltage $V_{dc}$ may be imposed on the switching devices from time to time. Thus, the voltage ratings of the inverter switching devices must be sufficient to withstand these stresses. Voltage stresses for the resonant DC link inverter result from the resonant action of the LC elements in the DC link, and the modulation strategy used in the inverter itself. Under steady state conditions, the DC link resonant cycle is always started with a fixed value of initial capacitor current. This ensures a "deadbeat" resonant pulse response, even in the presence of modulation. Under these conditions, volt-second balance across the inductors in the resonant link requires peak voltage stresses across the switching devices of the inverter of at least twice the DC source voltage $Vd_{dc}$. Under transient conditions, when instantaneous power flow reverses and DC link current switches and flows back into the DC source, a one-cycle transient is obtained during which the peak voltage stress exceeds the steady state values.

The voltage stress across the DC bus may be limited by use of a passive or active clamp circuit. Whichever type of clamp circuit is used, sufficient energy must be returned from the clamp to the resonant DC link during each cycle in which clamping occurs to ensure that the DC bus voltage returns to zero volts and the oscillation of the resonant DC link is maintained.

In the exemplary DC resonant link inverter 120 of the present invention, an active clamp is provided to limit voltage stress across the DC bus lines 146 and 147. The active clamp is connected across the resonant DC link circuit. The active clamp includes a clamping capacitor 190 connected in series with a power transistor switch 192. The power transistor switch 192 has a diode 194 connected in anti-parallel across it. The clamping capacitor 190 is preferably an electrolytic capacitor, which is pre-charged to the desired clamping voltage level. The voltage supplied by the clamping capacitor 190 alternatively may be supplied by a voltage source, such as a battery. However, use of a clamping capacitor 190 is preferred, since it is a completely passive and relatively inexpensive device, and an actual voltage source is not needed as the capacitor 190 is periodically recharged during the operation of the clamping circuit, as explained further below.

When the voltage across the DC bus lines 146 and 147 exceeds the clamping voltage level established on the clamping capacitor 190, the diode 194 turns on, and the DC bus voltage is effectively clamped to the clamping voltage level. Assuming that the clamping capacitor 190 is sufficiently large, there will be relatively little voltage rise across the DC bus lines 146 and 147 (the DC bus voltage may increase slightly from the clamping voltage level as the clamping capacitor 190 is charged up). With the diode 194 conducting, the switching device 192 is turned on in a loss-less manner by the system controller 170. The current flow eventually transfers from the diode 194 to the transistor 192 when the clamping capacitor 190 begins to discharge to return the energy stored in it to the resonant DC link circuit. When the net charge transferred to the clamping capacitor 190 is zero, the clamp switching device 192 is turned off, and the resonant DC link composed of the capacitor 186 and inductors 188 and 189 resonates in the manner described above. Details concerning the operation and control of active clamping circuits for resonant link inverters will be well known to those having skill in the art of ACRDCL inverters. Further details may also be found in U.S. Pat. No. 4,864,483.

Given the constraint of turning the inverter switching devices 150–157 in the inverter legs on and off only at times of zero voltage across the DC bus lines 146 and 147, a modulation strategy for controlling the inverter switching devices 150–157 is selected such that three-phase sinusoidal voltage waveforms are synthesized on the inverter output lines providing power to the three-phase load 122, and such that common mode voltage at the filter neutral node is reduced or eliminated. Reduction or elimination of the common mode voltage is achieved by ensuring that, at any one time, an equal number of inverter legs have their outputs connected to the positive DC bus line 146 as to the negative DC bus line 147. Under this modulation constraint, an equal number of inverter legs apply the instantaneous positive voltage level on the positive DC bus line 146 to the output of the inverter as apply the instantaneous negative voltage level, of equal magnitude, on the negative DC bus line 147 to the output of the inverter, thereby eliminating the common mode voltage at the inverter output.

An exemplary control system and modulation strategy for controlling the inverter leg switching devices 150–157 of the ACRDCL inverter 120 to synthesize a desired three-phase output voltage signal, subject to the modulation constraint of the present invention necessary for reducing the common mode voltage, is described with reference to the schematic block diagrams of FIGS. 8 and 9. The exemplary modulation strategy to be described may be implemented in the system controller 170 using analog and/or digital circuit components. Preferably, the exemplary modulation strategy may be implemented using a microprocessor or other programmable digital device. Note that the modulation strategy to be described is an example of only one possible modulation strategy for controlling the switching devices in a four-phase ACRDCL inverter in accordance with the present invention. Any modulation strategy which provides the desired three-phase output voltage signal, and which satisfies the modulation constraint of the present invention for reducing common mode voltage, may be used.

Control of the inverter switching devices begins be generating a phase error signal for each of the three inverter output phases that are connected to provide power to the three-phase load 122. FIG. 8 illustrates the generation of a phase error signal for phase a. The phase error signal for phase a is generated by first comparing the measured voltage $V_{an}$ between the phase a inverter output node and the filter neutral node, the voltage feedback signal, with the desired phase a output voltage $V_{an}^*$, the voltage reference signal. The feedback signal $V_{an}$ is subtracted from the reference signal $V_{an}^*$ at a summing junction 200. An active damping feedback signal, indicated by arrow 201, may also be combined with the reference and feedback voltage signals at the summing junction 200, if desired. Active damping in the feedback loop will help to reduce any transient resonances which may appear in the common mode voltage. The output of the summing junction 200, which is the instantaneous difference between the desired phase a output voltage and the actual output voltage, is fed to an integrator 202. The output of the integrator 202 is, in this case, the phase a error signal ean. Phase error signals ebn, for the phase b output of the inverter, and ecn, for the phase c output of the inverter, are generated in a manner similar to that illustrated in FIG. 8.

As illustrated in FIG. 9, the three phase error signals ean, ebn, and ecn are combined at summing junctions 206, 208, and 210 to provide line-to-line error signals eab, ebc, and eca, representing the differences between the phase error signals. The line-to-line error signals are provided, along with the phase error signals, to a lookup table 212. The four-phase inverter modulation strategy is incorporated in the lookup table 212 which, in response to the signals applied thereto, provides control signals which indicate the next switching state for each of the inverter leg switching devices 150–157. The control signals which are provided by the lookup table 212 are applied to a latching device 214. At the appropriate switching instant, i.e., when the voltage across the DC bus lines 146 and 147 is at zero volts, a signal applied to the latch 214 on line 216 latches the control signals provided by the lookup table 212 into the latch 214. The latched control signals are applied as switching device control signals, via appropriate driver circuitry, to the inverter switching devices 150–157. As discussed previously, by changing the state of the inverter switching devices 150–157 only at times of zero voltage on the DC bus lines 146 and 147, switching losses in the inverter 120 can be reduced, and inverter efficiency and switching frequency increased.

The lookup table logic is implemented to provide switching device control signals which produce the desired three-phase output voltage of the inverter, and to ensure that the modulation constraint of the present invention is satisfied. The lookup table logic thus ensures that an equal number of inverter leg outputs are connected to the positive DC bus line 146 as are connected to the negative DC bus line 147. The lookup table logic may preferably be implemented as follows:

First, the three phase error signals ean, ebn, and ecn are considered. If two of the phase error signals are positive, and one is negative, then the switching devices in the inverter legs corresponding to the two positive errors are switched to connect the positive DC bus line 146 to the outputs of those inverter legs, i.e., the phases are switched high. The switching devices in the other two inverter legs, one of which is the fourth inverter leg, are switched to connect the negative DC bus line 147 to the outputs of those inverter legs, i.e., the phases are switched low. Similarly, if two of the phase error signals are negative, and one is positive, then the switching devices in the inverter legs corresponding to the two negative errors are switched to connect the negative DC bus line 147 to the outputs of those inverter legs, and the switching devices in the other two inverter legs, one of which is the fourth inverter leg, are switched to connect the positive DC bus line 146 to those inverter leg outputs.

If all three phase error signals, ean, ebn, and ecn, are either positive or negative, then the line-to-line error signals eab, ebc, and eca, are used to rank the phase errors in terms of magnitude. If the phase error signals are all positive, then the switching devices in the inverter leg corresponding to the phase with the smallest phase error are switched to connect the negative DC bus line 147 to the inverter leg output. The switching devices in the fourth inverter leg are also controlled to connect the negative DC bus line 147 to the inverter leg output. The switching devices in the other two inverter legs are controlled to connect the positive DC bus line 146 to the inverter leg outputs. If all of the phase error signals are negative, then the switching devices in the inverter leg corresponding to the phase having the largest phase error are switched to connect the positive DC bus line 146 to the inverter leg output. The switching devices in the fourth inverter leg are also switched to connect the inverter leg output to the positive DC bus line 146. The switching devices in the remaining two inverter legs are switched to connect the negative DC bus line 147 to the inverter leg outputs.

If all of the phase error signals ean, ebn, and ecn, as well as the line-to-line error signals, eab, ebc, and eca, are positive or negative, any arbitrary switching state which satisfies the modulation constraint may be selected.

It is apparent that this modulation strategy always satisfies the modulation constraint of the present invention. In each case, the modulation strategy ensures that the switching devices in the fourth inverter leg are controlled such that an equal number of inverter leg outputs are connected to the positive DC bus line 146 as are connected to the negative DC bus line 147. By controlling a four-phase inverter in accordance with the modulation strategy just described, regulated sinusoidal three-phase power may be provided to the three-phase load 122, and common mode voltage reduced or eliminated.

Figure 7:
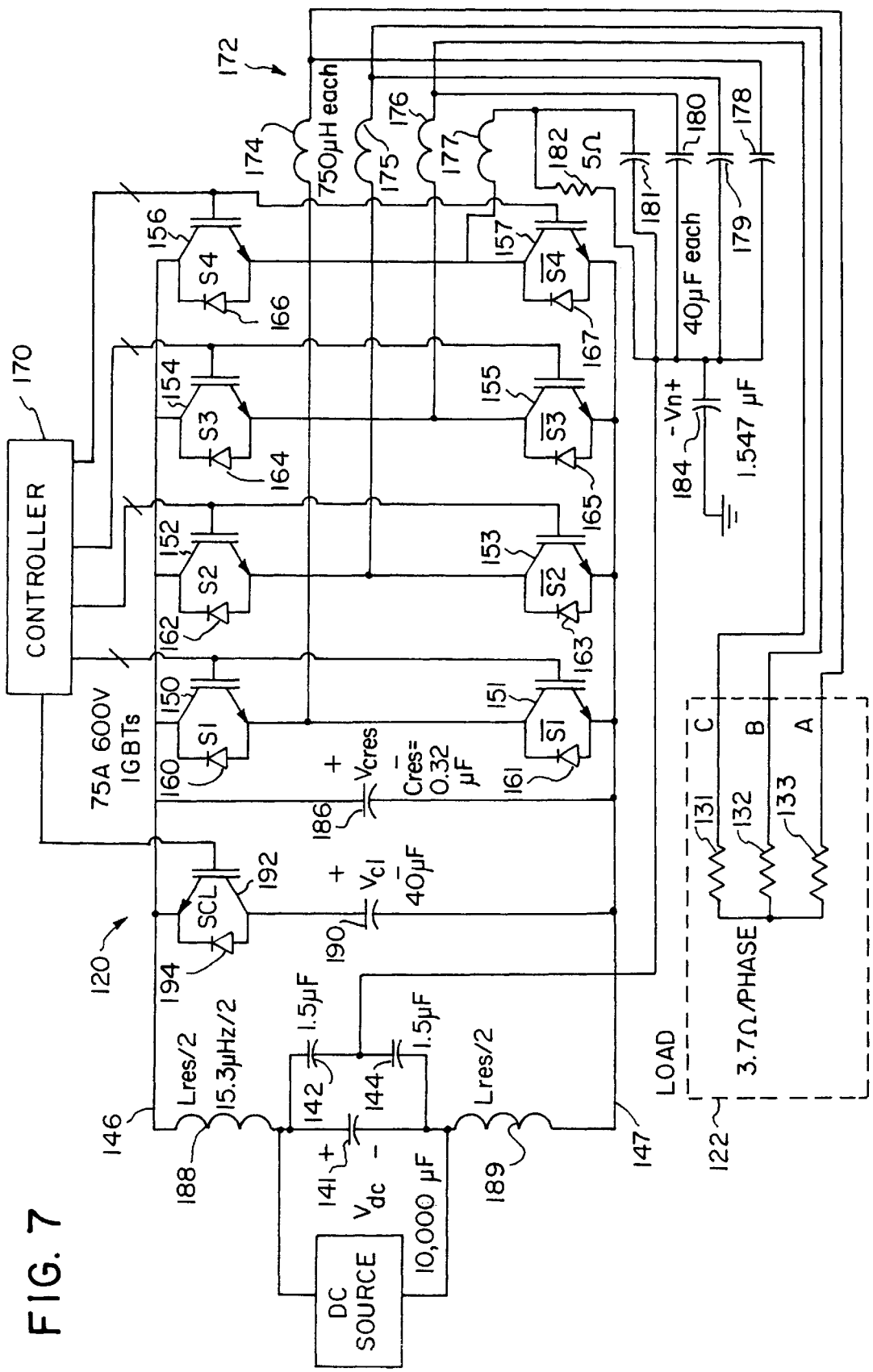
FIG. 7 is a schematic circuit diagram of a four-phase actively clamped resonant DC link inverter in accordance with the present invention for providing power to a three-phase load and for reducing the common mode voltage.

The exemplary power conversion system illustrated in FIG. 7, including the four-phase ACRDCL inverter 120, and the four-phase filter 172, was constructed and tested to verify experimentally the reduction of common mode filter neutral voltage made possible by the present invention. Although the ideal model of a power conversion system in accordance with the present invention suggests that the common mode neutral voltage can be eliminated, experimental results indicate that many factors, such as a non-ideal second order filter 172, and non-ideal switching, contribute a certain amount of common mode neutral voltage.

Figure 10:
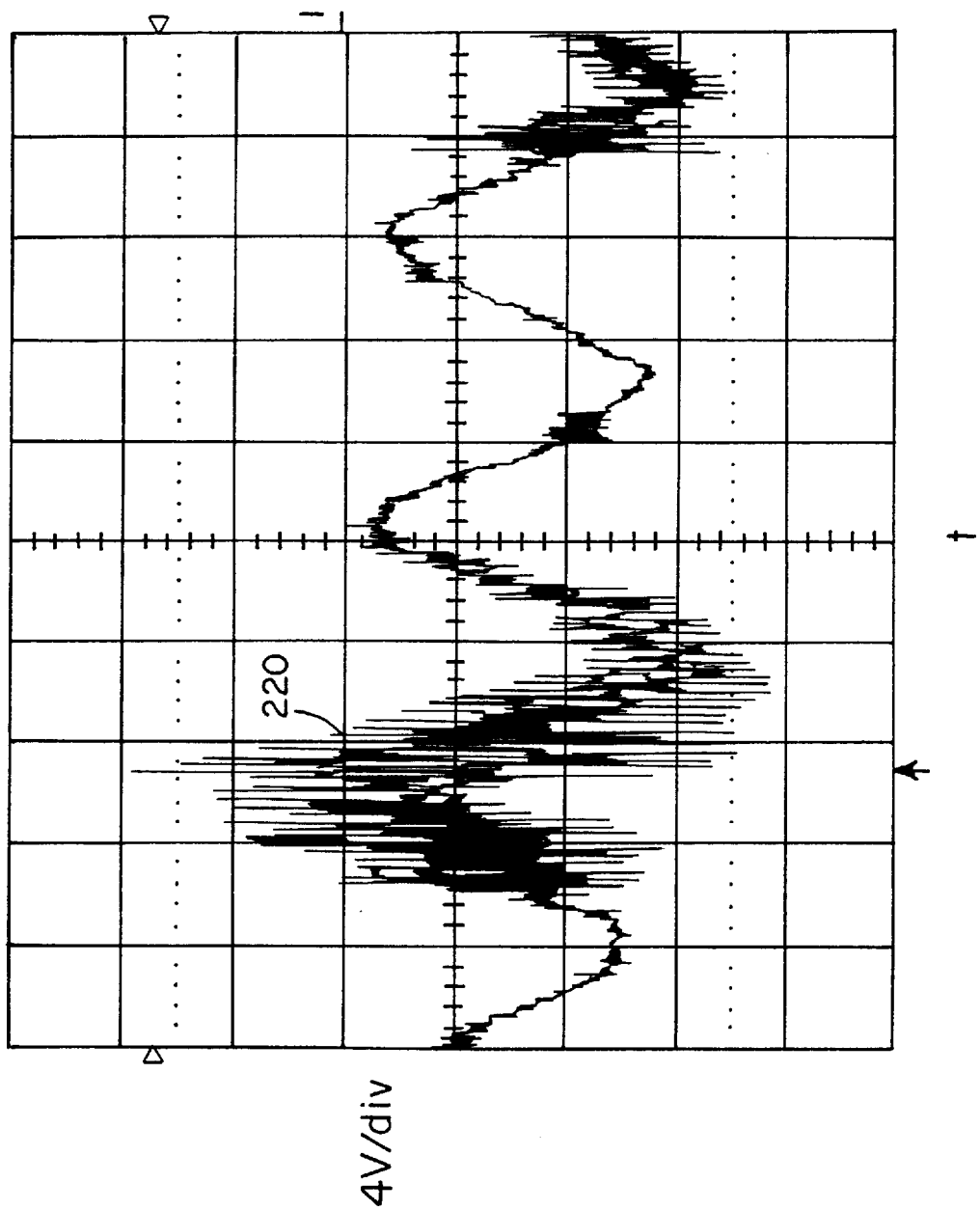
FIG. 10 is a waveform diagram of the measured neutral to ground voltage of a three-phase load being provided with power by a four-phase actively clamped resonant DC link inverter in accordance with the present invention.
Figure 11:
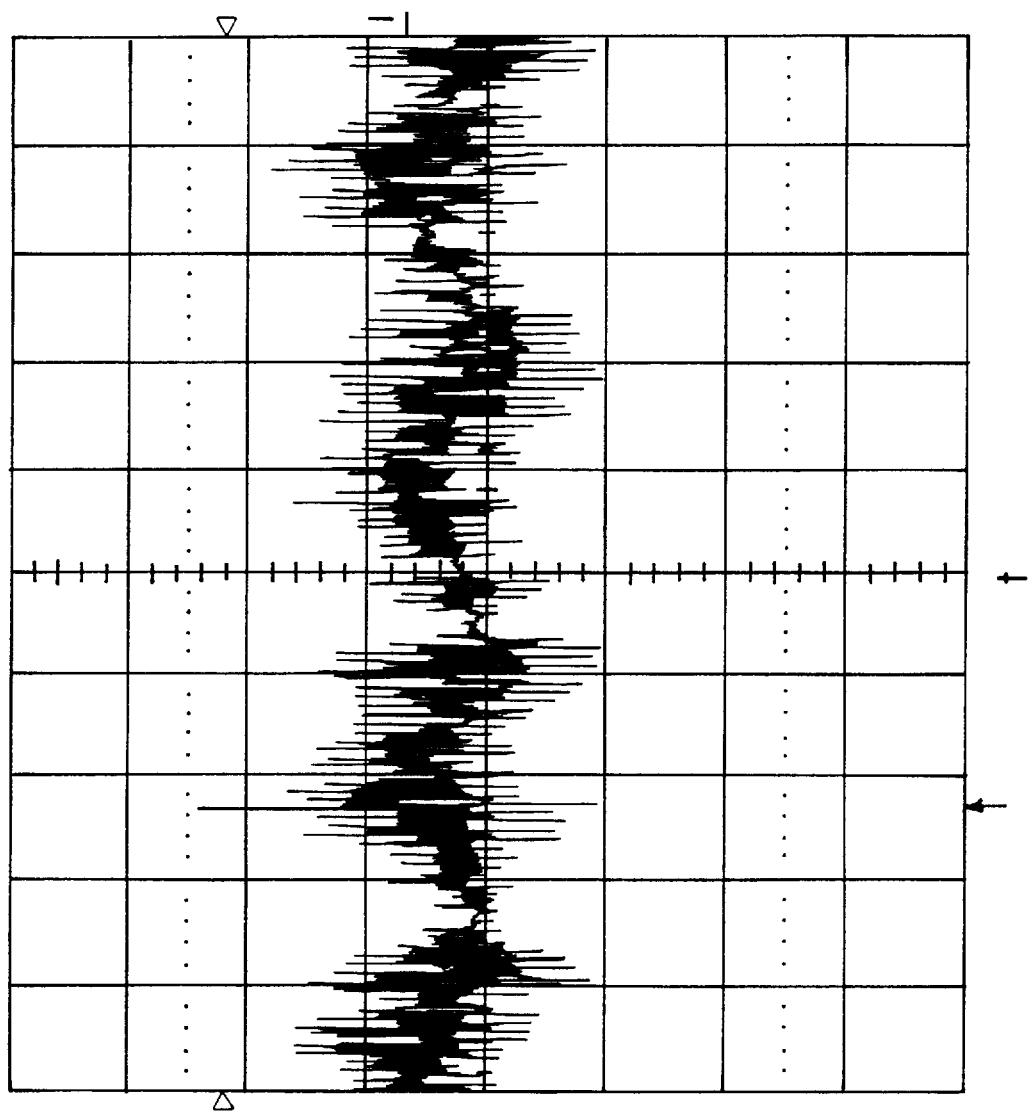
FIG. 11 is a waveform diagram of the measured neutral to ground voltage of a three-phase load being provided with power by a conventional three-phase actively clamped resonant DC link inverter.

FIG. 10 shows the measured common mode voltage with respect to earth ground for the experimental power conversion system in accordance with the present invention. A parasitic effect in the experimental circuit is a common mode resonance 220, introduced by the capacitor 184 connected from the filter neutral to ground. However, as can be seen from FIG. 10, this resonance is not always present. FIG. 11 shows the measured neutral voltage for a conventional three-phase inverter supplying power to a three-phase load, and controlled using a traditional sigma delta modulation control strategy. In the conventional three-phase case, a common mode voltage is always present to drive the common mode resonance. Examining FIG. 11, it is apparent that the oscillations are not transient phenomena, but rather are persistent oscillations arising because the common mode voltage is always present in the three-phase case. Thus, common mode neutral voltage excursions are increased considerably for the conventional system.

The experimental results illustrated in FIGS. 10 and 11 show that, in practice, realization of a zero common mode neutral voltage is difficult to achieve. It is very difficult to achieve perfectly balanced filter components. Moreover, as shown in Equation 14, the common mode neutral voltage is not zero when the common mode impedance of the load is not infinite. Finally, in practice, the assumption of Equation 1 is no longer valid. The pole voltages of the power conversion system are affected by inverter switching device characteristics, and this behavior is affected by the current level. To address these and other deviations from the ideal system, some additional filter components may be added, and the control of the system modified, in order to further reduce the common mode voltage level. For example, by employing active damping in the feedback loop for controlling the inverter switching devices, the transient resonances shown in FIG. 10 may be reduced even Nevertheless, in comparing FIGS. 10 and 11, it is apparent that the experimental results substantially support the simulation results. Common mode voltage due to modulation energy is dramatically reduced when a four-phase inverter in accordance with the present invention is used to provide power to a balanced three-phase load. (Note the different scales in FIGS. 10 and 11.)

Figure 12:
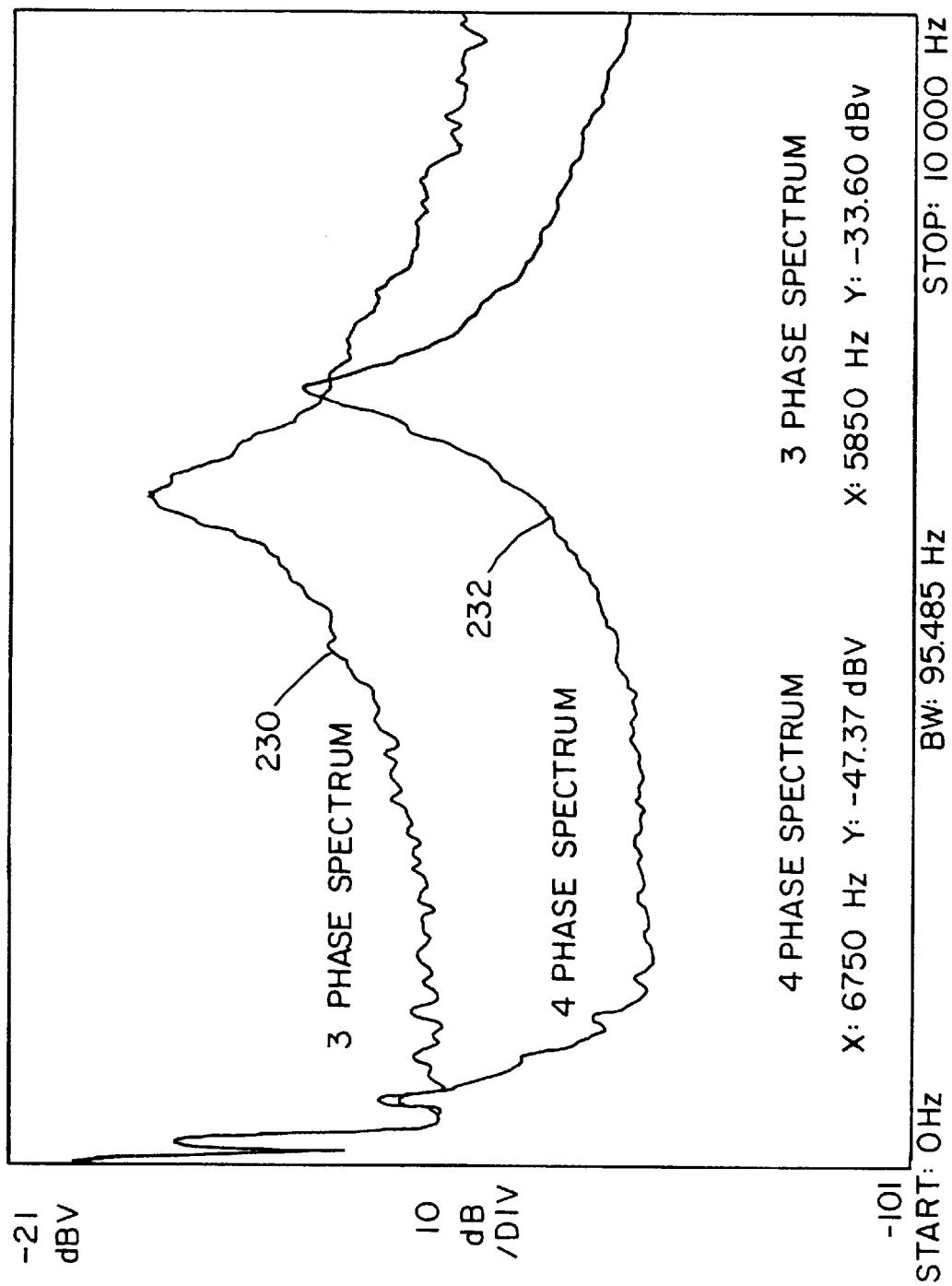
FIG. 12 is a plot of the measured frequency spectra of the neutral to ground voltage of a three-phase load being provided with power by a conventional three-phase actively clamped resonant DC link inverter and by a four-phase actively clamped resonant DC link inverter in accordance with the present invention.

In FIG. 12, the average spectra of the common mode neutral voltage for the conventional three-phase inverter topology 230 and the experimental four-phase inverter topology in accordance with the present invention 232 are plotted. The significant spectral components in the common mode neutral voltages for both plots, i.e., the significant peaks illustrated in FIG. 12, are summarized in Table 1.

TABLE I

SIGNIFICANT SPECTRAL COMPONENTS OF THE COMMON MODE VOLTAGE
(Experimental Results)

| Freq. (Hz) | 4 Phase (dBV) | 3 Phase (dBV) |
|---|---|---|
| 87.5 | −57.8 | −59.7 |
| 180 | −35.9 | −35.8 |
| 265 | −61.0 | −64.8 |
| 540 | −58.2 | −54.4 |
| 900 | −71.0 | −63.9 |
| 5850 | — | −33.6 |
| 6750 | −47.4 | — |

The fundamental output frequency is 87.5 Hz. A small third harmonic of the fundamental is also present in the neutral voltage. For the four-phase case, the modulation energy is centered at 6750 Hz, where the amplitude is −47.4 dBV. For the three-phase case, the modulation energy is centered at 5850 Hz, where the amplitude is −33.6 dBV. The peak of modulation energy is five times higher for the three-phase case. The neutral voltage component at 180 Hz is due to effects of the diode rectifier which is used to provide the DC source voltage. This component of common mode voltage is the dominant element in the four-phase case, because all of the other harmonics are reduced. The amplitude of this source harmonic does not change when the fourth leg of the inverter is added. This result is expected, since the input common mode harmonics cannot be controlled by the inverter. Third and fifth harmonics of the 180 Hz component due to the input rectifier also appear in the common mode neutral voltage.

Use of a four-phase inverter topology and modulation strategy in accordance with the present invention does not impact the line-to-line output voltage of the power conversion system. Essentially no change in the line-to-line output voltage is measured between the conventional three-phase case and the experimental four-phase case. For the conventional three-phase case, the total harmonic distortion in the first twenty harmonics is 1.3%. For the four-phase case, the total harmonic distortion is 1.4%.

Although described in detail to this point with respect to four-phase inverters for providing power to three-phase loads, the present invention may be applied for reducing or eliminating common mode voltage in any multi-phase power conversion system having an inverter with an even number of output phases. In each case, the DC source voltage provided to the inverter must be symmetric about ground. The inverter switching devices are then controlled such that, at any one time, the switching devices in half of the inverter legs are switched to connect a positive voltage to the inverter leg outputs, while the switching devices in the other half of the inverter legs are switched to connect a negative voltage of equal magnitude to the inverter leg outputs. An inverter topology and modulation strategy in accordance with the present invention may be used to significantly reduce the common mode voltage of the power conversion system. Common mode voltage can, theoretically, be eliminated, provided that the load being supplied by the power conversion system of the present invention is a balanced impedance. A multi-phase LC filter provided between the output of a power conversion system in accordance with the present invention and the input of a multi-phase load may be used to establish the balanced impedance condition. Further exemplary embodiments of the present invention will now be described briefly.

Figure 13:
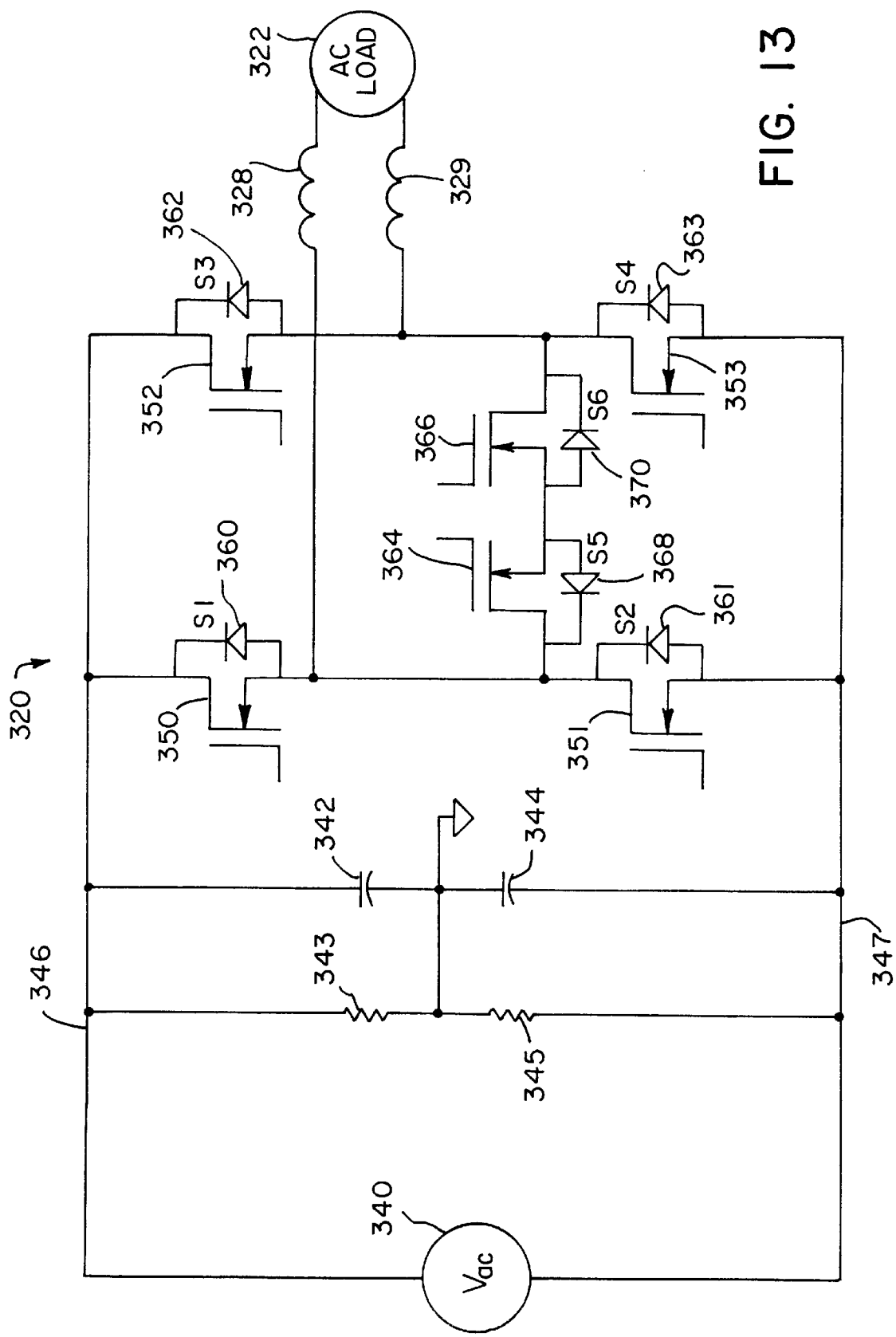
FIG. 13 is a schematic circuit diagram of a two-terminal (single phase) power conversion system in accordance with the present invention for reducing common mode voltage.

A two-terminal power conversion system in accordance with the present invention is illustrated in and described with reference to FIG. 13. (A two-terminal system is commonly referred to as a single phase system.) The two-terminal power conversion system includes a two-terminal inverter 320 connected to provide power to a two-terminal load 322. The two-terminal load 322 may be any single phase load, such as a single phase motor. In this case, the load 322 is characterized by leakage inductances 328 and 329.

A DC voltage source 340, which may be implemented as an AC-to-DC converter receiving power from an external AC power source, or as an independent DC voltage source, such as a battery, provides a DC source voltage of $V_{dc}$ to the inverter 320. The DC source voltage is divided evenly across two series connected capacitors 342 and 344 of equal value. The center point node at which the two capacitors 342 and 344 are connected together is connected to ground. Resistors 343 and 345 are connected in parallel with the capacitors 342 and 344, respectively. The only function of the resistors 343 and 345 is to ensure balancing of the DC source voltage across the two capacitors 342 and 344. Dividing the DC source voltage evenly across the capacitors 342 and 344, and connecting the common node of the capacitors 342 and 344 to ground, ensures that a voltage of $+V_{dc}/2$, with respect to ground, is provided on a positive DC bus line 346 of the inverter, and a voltage of $-V_{dc}/2$, with respect to ground, is provided on a negative DC bus line 347 of the inverter.

Two pair of inverter switching devices 350 and 351, and 352 and 353, are connected across the DC bus lines 346 and 347 to form the two legs of the inverter 320. Each switching device 350–353 has an associated anti-parallel connected diode 360–363, respectively. The center point nodes at which the switching devices in each pair of switching devices 350 and 351, and 352 and 353, are connected together, form the outputs of the inverter legs. The inverter leg outputs are connected to the terminals of the two-terminal load 322. Switching devices 364 and 366, with anti-parallel connected diodes 368 and 370, respectively, are connected in series between the inverter leg outputs. The switching devices 364 and 366 are connected to conduct in opposite directions when turned on.

The inverter leg switching devices 350–353, and the switching devices 364 and 366, are controlled by a system controller (not shown in FIG. 13) to apply the voltages on the DC bus lines 346 and 347 to the inverter leg outputs in a pattern to synthesize an AC voltage waveform which is provided to the two-terminal load 322. The modulation strategy used to synthesize the AC voltage waveform is subject to the modulation constraint of the present invention. In accordance with the present invention, either switches 350 and 353 are turned on, to apply $+V_{dc}/2$ to the first terminal of the load 322 and $-V_{dc}/2$ to the second terminal of the load 322, switches 351 and 352 are turned on, to apply $-V_{dc}/2$ to the first terminal of the load 322 and $+V_{dc}/2$ to the second terminal of the load 322, or switching devices 364 and 366 are turned on, to thereby short the load terminals to apply zero volts to the load and to ensure that the inverter leg switching devices 350–353 share the blocked DC source voltage evenly. Thus, in accordance with the present invention, the switching devices 350–353, and 364 and 366, are controlled such that the voltages applied to each terminal of the two terminal load at any one time are equal in magnitude and oppositely poled. Controlling the inverter switching devices in accordance with the modulation constraint of the present invention makes possible a significant reduction in common mode voltage, provided that the load 322 is a balanced impedance. Balancing of the load impedance may be achieved using an LC filter connected between the two-terminal inverter 320 and the load 322.

Figure 14:
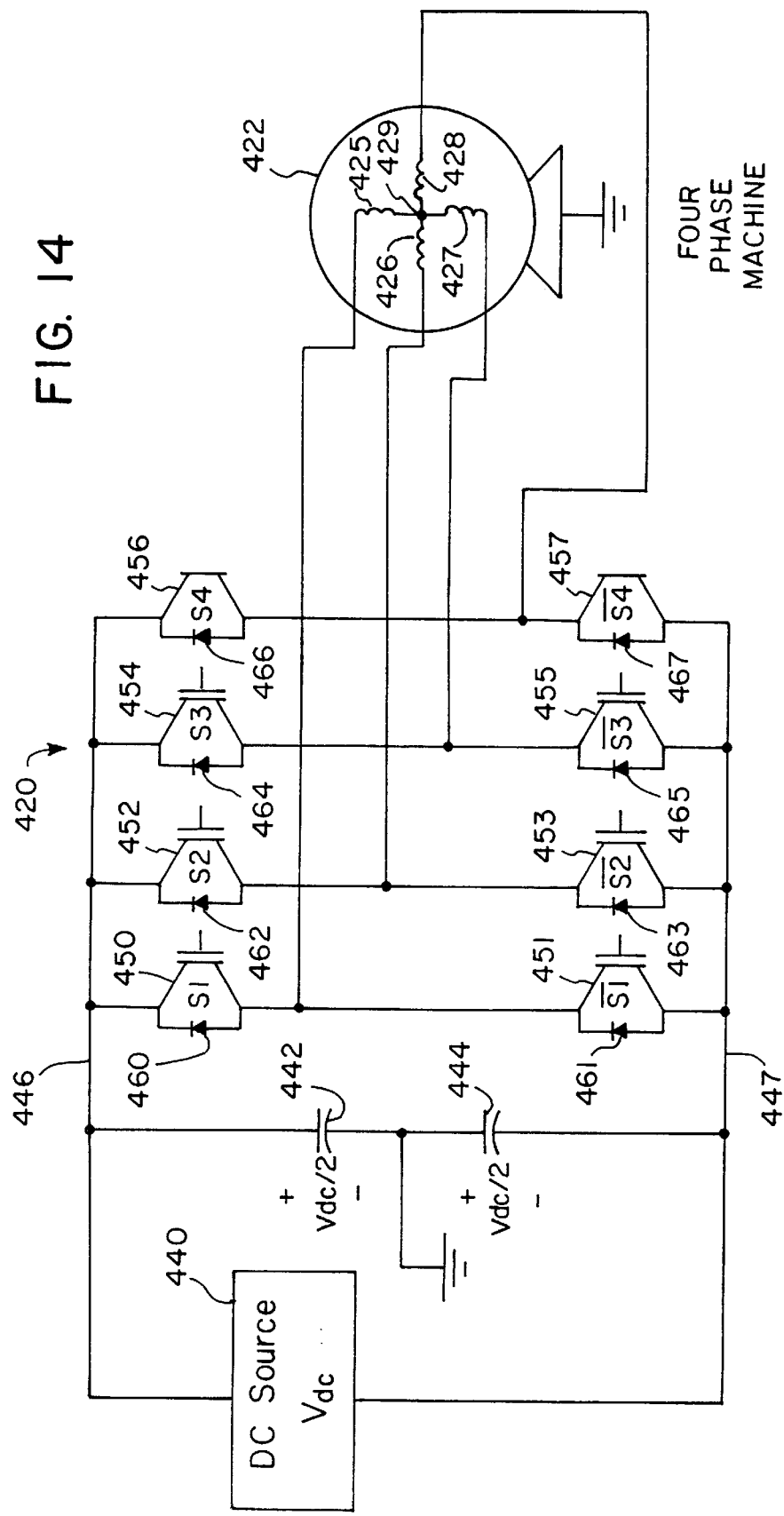
FIG. 14 is a schematic circuit diagram of a four-phase inverter in accordance with the present invention for providing power to a four-phase load and for reducing the common mode voltage.

Another embodiment of a power conversion system in accordance with the present invention is illustrated in and described with reference to FIG. 14. This system includes a four-phase inverter 420 connected to provide power to a four-phase load 422. The four-phase load 422 may be a four-phase machine, such as a four-phase motor, having four phase windings 425–428 connected together at a machine neutral node 429. The phase windings 425–428 in the motor load 422 are displaced mutually by 90 electrical degrees.

The four-phase inverter 420, which is similar to the four-phase inverter 20 illustrated in FIG. 1, is provided a DC source voltage of $V_{dc}$, from a DC voltage source 440. The DC source voltage may be provided by an AC-to-DC converter, receiving power from an external AC power supply, or by an independent DC power source, such as a battery. The DC source voltage is divided evenly across two series connected capacitors 442 and 444. The center point node at which the two capacitors 442 and 444 are connected together is connected to ground. This ensures that a voltage of $+V_{dc}/2$ is provided on a positive DC bus line 446 of the inverter 420, and a voltage of $-V_{dc}/2$ is provided on a negative DC bus line 447 of the inverter 420.

Four pair of inverter switching devices 450 and 451, 452 and 453, 454 and 455, and 456 and 457, with anti-parallel connected diodes 460 and 461, 462 and 463, 464 and 465, and 466 and 467, respectively, form the four legs of the four-phase inverter 420. The center point node at which the switching devices in each pair of inverter switching devices are connected together forms the output of each inverter leg. Each inverter leg output is connected to one of the phase windings of the four-phase machine load 422.

To reduce or eliminate common mode voltage at the neutral point 429 of the four-phase machine 422, the inverter switching devices 450–457 are controlled by a system controller (not shown in FIG. 14), such that, at any one time, an equal number of inverter leg outputs are connected to the positive DC bus line 446 as are connected to the negative DC bus line 447. The inverter switching devices 450–457 may be controlled to provide output voltage signals on the inverter leg outputs such that each of the two load phase windings producing flux in the same direction are switched in a complementary fashion. As a result, two phase windings are always connected to the positive DC bus line 446, while the other two phase windings are always connected to the negative DC bus line 447. The machine neutral 429 therefore remains at zero volts with respect to the center point of the capacitors 442 and 444, which is connected to ground. Thus, in accordance with the present invention, common mode voltage, and, therefore, common mode current, is substantially reduced or eliminated, provided that the load 422 appears as a balanced impedance. Balancing of the inverter output may be accomplished, if necessary, using a four-phase LC filter connected between the four-phase inverter 420 and the four-phase load 422.

Figure 15:
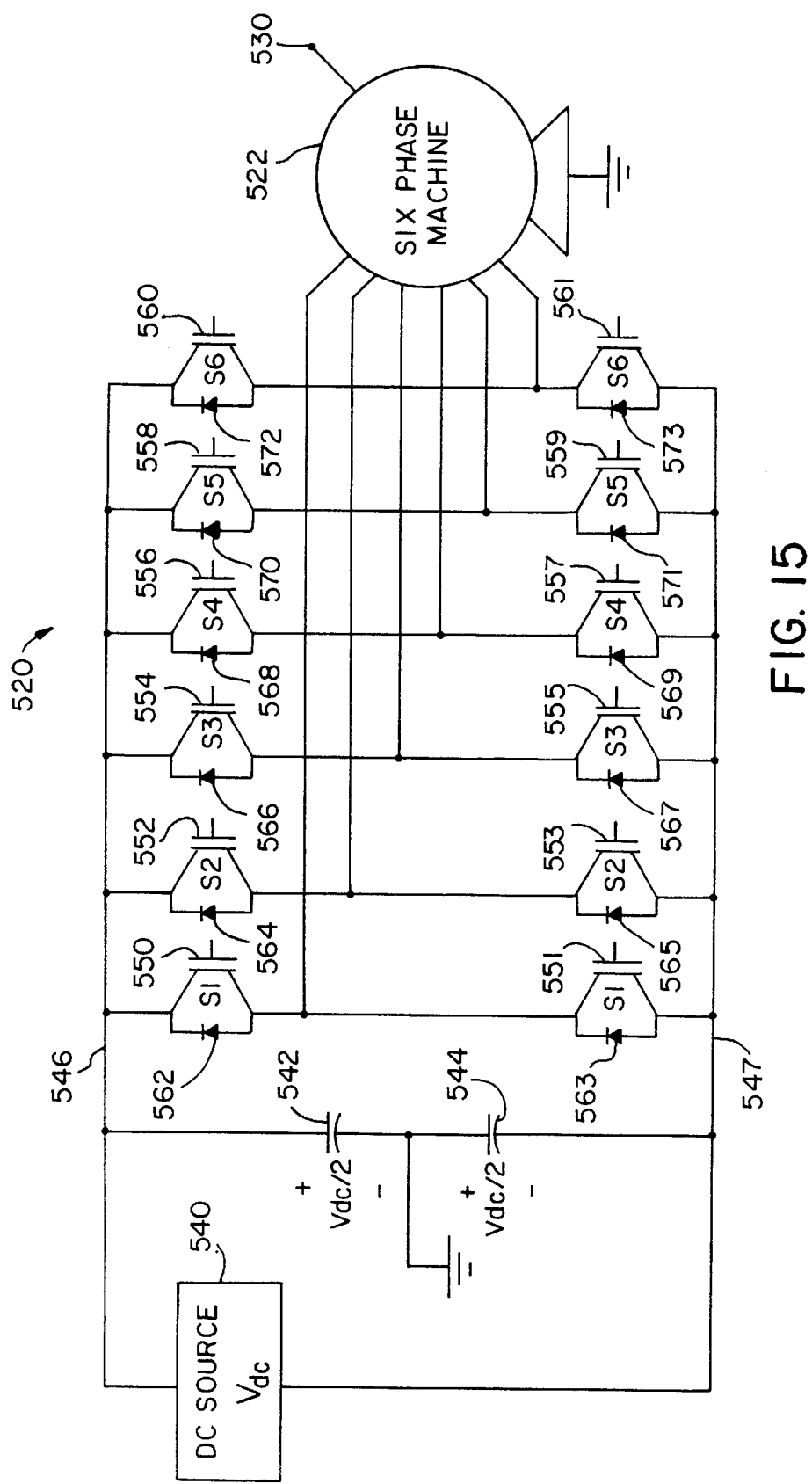
FIG. 15 is a schematic circuit diagram of a six-phase inverter in accordance with the present invention for providing power to a six-phase load and for reducing the common mode voltage.

A further exemplary embodiment of the present invention is illustrated in and described with reference to FIG. 15. In this embodiment of the present invention, a six-phase inverter 520 is connected to provide power to a six-phase machine load 522, such as a six-phase motor. As discussed previously, in order for the present invention to most effectively reduce common mode voltage, the load 522 must be a balanced, or nearly balanced, impedance. A balanced load may be achieved using a six-phase filter, or two three-phase filters, (not shown in FIG. 15), connected between the inverter 520 and the load 522, or by a six-phase machine 522 which is, itself, balanced.

The six-phase motor load 522 has six phase windings which may be connected in a variety of ways. As illustrated in FIG. 16, the six phase windings 524a–529a of the six-phase motor load 522 may be connected as dual three-phase motor windings, with a 30 degree phase shift between each three-phase group. The common nodes 530a of each three-phase group together form the common node 530 of the six-phase machine 522. As illustrated in FIG. 17, the six phase windings 524b–529b of the six-phase motor load 522 may be connected as dual three-phase winding groups, with a 30 degree phase shift between winding groups, and a common neutral point 530b which forms the common node 530 of the six-phase machine 522. As a third alternative, illustrated in FIG. 18, the six phase windings 524c–529c of the six-phase motor load 522 may be connected to form a true six-phase machine, with a 60 degree phase shift between each of the phase windings 524c–529c, and a common neutral point 530c which forms the machine neutral 530 of the six-phase load 522.

A DC voltage source 540 provides a DC source voltage $V_{dc}$ to the six-phase inverter 520. The DC source voltage may be provided by an AC-to-DC power converter, receiving power from a main AC power supply, or by an independent DC source, such as a battery. The DC source voltage is divided evenly across series connected capacitors 542 and 544. The center point between the two capacitors 542 and 544 is connected to ground. Therefore, a voltage of $+V_{dc}/2$ is provided to a positive DC bus line 546 of the inverter 520, and a voltage of $-V_{dc}/2$ is applied to a negative DC bus line 547 of the inverter.

Six pair of inverter switching devices 550 and 551, 552 and 553, 554 and 555, 556 and 557, 558 and 559, and 560 and 561, with anti-parallel connected diodes 562 and 563, 564 and 565, 566 and 567, 568 and 569, 570 and 571, and 572 and 573, respectively, are connected across the positive 546 and negative 547 DC bus lines to form the six legs of the inverter 520. The common point wherein the switching devices in each pair of switching devices are connected together forms the output of each inverter leg. Each inverter leg output is connected to one of the windings of the six-phase machine load 522.

The inverter switching devices 550–561 in the six inverter legs are controlled by a system controller (not shown in FIG. 15) such that, at any one time, three of the inverter leg outputs are connected to the positive DC bus line 546, and the other three inverter leg outputs are connected to the negative DC bus line 547. This modulation constraint is employed regardless of which way the windings of the six-phase machine 522 are connected. By employing the modulation constraint of the present invention, the machine neutral 530 of the six-phase load 522 remains at approximately zero volts with respect to the center point of the two capacitors 542 and 544, which is connected to ground. Thus, common mode voltage, and, therefore, common mode current, in the six-phase load 522, is substantially reduced, or even eliminated.

It is understood that this invention is not confined to the particular embodiments, implementations, and applications herein illustrated and described, but embraces all such modified forms thereof as come within the scope of the following claims.

What is claimed is:

1. A multi-phase power conversion system for reducing common mode voltage, comprising:
    (a) a DC-to-AC power inverter having an even number of at least four inverter legs connected between positive and negative DC bus lines, wherein each inverter leg includes inverter switching devices responsive to switching device control signals to connect the positive or negative DC bus lines to an inverter leg output;
    (b) means for symmetrizing a DC source voltage provided to the positive and negative DC bus lines such that the DC source voltages applied to the positive and negative DC bus lines are symmetric about ground; and
    (c) switching device controller means for providing the switching device control signals to the inverter switching devices in the inverter legs to switch the inverter switching devices in a pattern which implements a modulation strategy such that a multi-phase AC voltage waveform is synthesized on at least three of the inverter leg outputs, and wherein the modulation strategy is subject to a modulation constraint such that at all times an equal number of the inverter leg outputs are connected to the positive DC bus line by the inverter switching devices as are connected to the negative DC bus line by the inverter switching devices.

2. The power conversion system of claim 1 comprising additionally a balanced impedance load having a plurality of inputs and a neutral node and wherein the inputs but not the neutral node are connected to the inverter leg outputs.

3. The power conversion system of claim 2 wherein the balanced impedance load includes a multi-phase machine having a number of phases equal to the number of inverter legs.

4. The power conversion system of claim 2 wherein the balanced impedance load includes a multi-phase LC filter having a number of phases equal to the number of inverter legs and connected between the inverter leg outputs and the load inputs such that the multi-phase LC filter balances the load impedance.

5. The power conversion system of claim 4 wherein the balanced impedance load includes a multi-phase machine having a fewer number of phases than the number of inverter legs, a number of inputs equaling the number of phases, and a neutral node, and wherein the multi-phase LC filter is connected between the inverter leg outputs and the inputs of the multi-phase machine.

6. The power conversion system of claim 1 wherein the inverter switching devices are IGBTs.

7. The power conversion system of claim 1 including additionally a DC voltage source including a battery connected to the means for symmetrizing.

8. The power conversion system of claim 1 including additionally a DC voltage source including an AC-to-DC converter connected to the means for symmetrizing.

9. The power conversion system of claim 1 wherein the means for symmetrizing includes first and second capacitors connected in series between the positive and negative DC bus lines, wherein the first and second capacitors are balanced, and wherein a center point at which the first and second capacitors are connected together is connected to ground.

10. The power conversion system of claim 1 comprising additionally a resonant link connected to the positive and negative DC bus lines, means for maintaining an oscillation on the resonant link such that the voltage between the positive and negative DC bus lines is periodically brought to zero volts, and wherein the switching device controller means includes means for providing the switching device control signals to switch the inverter switching devices only at times when there is zero voltage on the DC bus lines.

11. The power conversion system of claim 10 comprising additionally a clamping means for limiting the voltage across the positive and negative DC bus lines to a selected maximum level.

12. The power conversion system of claim 1 wherein the modulation strategy implemented by the switching device controller means is selected from the group of modulation strategies including: pulse width modulation, hysteresis modulation, space vector modulation, and pulse density modulation.

13. A multi-phase power conversion system for providing power to a multi-phase load having a plurality of inputs and a neutral node and for reducing common mode voltage, comprising:

(a) a DC-to-AC power inverter having an even number of inverter legs connected between positive and negative DC bus lines, wherein each inverter leg includes inverter switching devices responsive to switching device control signals to connect the positive or negative DC bus lines to an inverter leg output;

(b) means for symmetrizing a DC source voltage provided to the positive and negative DC bus lines such that the DC source voltages applied to the positive and negative DC bus lines are symmetric about ground;

(c) a multi-phase filter connected between the inverter leg outputs and the inputs but not the neutral node of the load such that the multi-phase filter presents a balanced impedance to the inverter; and (d) switching device controller means for providing the switching device control signals to the inverter switching devices in the inverter legs to switch the inverter switching devices in a pattern which implements a modulation strategy such that AC voltage waveforms are synthesized on at least some of the inverter leg outputs, and wherein the modulation strategy is subject to a modulation constraint such that at all times an equal number of the inverter leg outputs are connected to the positive DC bus line by the inverter switching devices as are connected to the negative DC bus line by the inverter switching devices.

14. The multi-phase power conversion system of claim 13 wherein the DC-to-AC inverter has four inverter legs, wherein a first three of the inverter leg outputs are adapted to be connected via the multi-phase filter to three input terminals of a three-phase load, wherein a fourth of the inverter leg outputs is adapted to be connected in parallel with the first three of the inverter leg outputs to the input terminals of the three phase load via the multi-phase filter, and wherein the switching device controller means includes means for implementing a modulation strategy such that a three-phase AC voltage waveform is synthesized on the first three inverter leg outputs and means for implementing the modulation constraint by providing switching device control signals to the inverter switching devices in the fourth inverter leg such that at all times two of the inverter leg outputs are connected to the positive DC bus line and the other two inverter leg outputs are connected to the negative DC bus line.

15. The multi-phase power conversion system of claim 13 wherein the inverter switching devices are IGBTs.

16. The multi-phase power conversion system of claim 13 including additionally a DC voltage source including a battery connected to the means for symmetrizing.

17. The multi-phase power conversion system of claim 13 including additionally a DC voltage source including an AC-to-DC converter connected to the means for symmetrizing.

18. The multi-phase power conversion system of claim 13 wherein the means for symmetrizing includes first and second capacitors connected in series between the positive and negative DC bus lines, wherein the first and second capacitors are balanced, and wherein a center point at which the first and second capacitors are connected together is connected to ground.

19. The multi-phase power conversion system of claim 13 comprising additionally a resonant link connected to the positive and negative DC bus lines, means for maintaining an oscillation on the resonant link such that the voltage between the positive and negative DC bus lines is periodically brought to zero volts, and wherein the switching device controller means includes means for providing the switching device control signals to switch the inverter switching devices only at times when there is zero voltage on the DC bus lines.

20. The multi-phase power conversion system of claim 19 comprising additionally a clamping means for limiting the voltage across the positive and negative DC bus lines to a selected maximum level.

21. The multi-phase power conversion system of claim 13 wherein the modulation strategy implemented by the switching device controller means is selected from the group of modulation strategies including: pulse width modulation, hysteresis modulation, space vector modulation, and pulse density modulation.

22. A method of converting power provided to a multi-phase load having a plurality of inputs and a neutral node and reducing common mode voltage, comprising the steps of:

(a) applying a DC source voltage to positive and negative DC bus lines of a DC-to-AC power inverter having an even number of at least four inverter legs connected between the positive and negative DC bus lines, wherein each inverter leg has an output;

(b) balancing the DC source voltage applied to the positive and negative DC bus lines such that the DC source voltage applied to the positive and negative DC bus lines is symmetric about ground;

(c) synthesizing a multi-phase AC voltage waveform on at least three of the inverter leg outputs by connecting the inverter leg outputs to the positive and negative DC bus lines in a pattern defined by a modulation strategy;

(d) applying a modulation constraint to the modulation strategy such that at all times an equal number of the inverter leg outputs are connected to the positive DC bus line as are connected to the negative DC bus line; and (e) connecting the inverter leg outputs to the inputs but not the neutral node of the load.

23. The method of claim 22 comprising the additional step of balancing a load impedance seen by the inverter leg outputs.

24. The method of claim 23 wherein the step of balancing the load impedance includes the step of connecting a multi-phase LC filter having a number of phases equal to the number of inverter legs between the inverter leg outputs and the load inputs such that the multi-phase LC filter balances the load impedance.

25. The method of claim 22 wherein the step of applying a DC source voltage to the positive and negative DC bus lines includes the step of converting an AC line voltage signal into the DC source voltage.

26. The method of claim 22 wherein the step of balancing the DC source voltage applied to the positive and negative DC bus lines includes the steps of connecting balanced first and second capacitors in series between the positive and negative DC bus lines, and connecting a center point at which the first and second capacitors are connected together to ground.

27. The method of claim 22 including the additional step of maintaining an oscillation on the DC bus lines such that the voltage between the positive and negative DC bus lines is periodically brought to zero volts, and wherein the step of synthesizing an AC voltage waveform includes the step of changing connections of the inverter leg outputs to the positive and negative DC bus lines only at times when there is zero voltage on the DC bus lines.

28. The method of claim 27 including the additional step of clamping the voltage across the positive and negative DC bus lines to limit the voltage across the positive and negative DC bus lines to a selected maximum level.

29. The method of claim 22 wherein the modulation strategy is selected from the group of modulation strategies including: pulse width modulation, hysteresis modulation, space vector modulation, and pulse density modulation.

30. A power conversion system for reducing common mode voltage, comprising:

(a) a two terminal DC-to-AC inverter having two inverter legs wherein each inverter leg includes two inverter switching devices responsive to switching device control signals connected together in series at an inverter leg output terminal between positive and negative DC bus lines and two inverter switching devices responsive to switching device control signals connected together in series between the two inverter leg output terminals to conduct in opposite directions when turned on;

(b) means for symmetrizing a DC source voltage provided to the positive and negative DC bus lines such that the DC source voltages applied to the positive and negative DC bus lines are symmetric about ground; and (c) switching device controller means for providing the switching device central signals to the inverter switching devices in the inverter to switch the inverter switching devices in a pattern which implements a modulation strategy such that an AC voltage waveform is synthesized on the inverter leg output terminals, and wherein the modulation strategy is subject to a modulation constraint such that at all times either switching devices in the inverter legs are turned on to connect the positive DC bus line to a first leg output terminal and to connect the negative DC bus line to a second leg output terminal, switching devices in the inverter legs are turned on to connect the negative DC bus line to the first leg output terminal and to connect the positive DC bus line to the second leg output terminal, or the two switching devices connected between the two inverter leg output terminals are turned on to thereby short the terminals.

* * * * *